US010859740B2

(12) United States Patent
Escuti et al.

(10) Patent No.: US 10,859,740 B2
(45) Date of Patent: Dec. 8, 2020

(54) BRAGG LIQUID CRYSTAL POLARIZATION GRATINGS

(71) Applicants: North Carolina State University, Raleigh, NC (US); ImagineOptix Corporation, Cary, NC (US)

(72) Inventors: Michael J. Escuti, Raleigh, NC (US); D. Jason Kekas, Raleigh, NC (US); Ravi K. Komanduri, Dulles, VA (US)

(73) Assignee: IMAGINEOPTIX CORPORATION, Durham, NC (US)

( * ) Notice: Subject to any disclaimer, the term of this patent is extended or adjusted under 35 U.S.C. 154(b) by 764 days.

(21) Appl. No.: 14/813,660

(22) Filed: Jul. 30, 2015

(65) Prior Publication Data
US 2016/0033698 A1   Feb. 4, 2016

Related U.S. Application Data

(60) Provisional application No. 62/031,260, filed on Jul. 31, 2014.

(51) Int. Cl.
*G02B 5/30* (2006.01)
*G02B 5/18* (2006.01)
(Continued)

(52) U.S. Cl.
CPC ......... *G02B 5/3016* (2013.01); *G02B 5/1833* (2013.01); *G02F 1/1334* (2013.01); *G02B 27/283* (2013.01); *G02F 2201/305* (2013.01)

(58) Field of Classification Search
CPC ...... G02B 5/30; G02B 5/1833; G02B 5/3016; G02B 5/3083; G02B 5/3008; G02B 5/3025
See application file for complete search history.

(56) References Cited

U.S. PATENT DOCUMENTS

| 5,903,330 A | 5/1999 | Fünfschilling et al. |
| 7,570,427 B2 * | 8/2009 | Hasman ............... G02B 5/1809 359/485.01 |

(Continued)

FOREIGN PATENT DOCUMENTS

| CN | 101133348 | 2/2008 |
| EP | 1886171 B1 | 5/2012 |

(Continued)

OTHER PUBLICATIONS

Extended European Search Report Corresponding to European Application No. 15826835.9 (9 pages) (dated Sep. 29, 2017).

(Continued)

*Primary Examiner* — Alexander P Gross
(74) *Attorney, Agent, or Firm* — Myers Bigel, P.A.

(57) ABSTRACT

An optical element includes a plurality of stacked birefringent sublayers, such as liquid crystal sublayers, configured to alter a direction of propagation of light passing therethrough according to the Bragg condition. The stacked birefringent sublayers respectively include local optical axes that vary along respective interfaces between adjacent ones of the stacked birefringent sublayers to define respective grating periods. The respective thicknesses of the stacked birefringent sublayers may be less than a wavelength of the light. Related apparatus and methods of operation are also discussed.

31 Claims, 10 Drawing Sheets

(51) Int. Cl.
*G02F 1/1334* (2006.01)
*G02B 27/28* (2006.01)

(56) References Cited

U.S. PATENT DOCUMENTS

| | | | |
|---|---|---|---|
| 2004/0008391 A1 | 1/2004 | Bowley et al. | |
| 2005/0140837 A1 | 6/2005 | Crawford et al. | |
| 2007/0053028 A1* | 3/2007 | Ezra | G02B 5/1861 359/2 |
| 2008/0278675 A1* | 11/2008 | Escuti | G02B 5/1833 349/201 |
| 2011/0279900 A1 | 11/2011 | Wang et al. | |
| 2013/0077040 A1 | 3/2013 | Escuti et al. | |
| 2014/0363338 A1* | 12/2014 | Sukegawa | G01J 3/0291 422/82.09 |

FOREIGN PATENT DOCUMENTS

| | | |
|---|---|---|
| JP | 2003066232 A | 3/2003 |
| KR | 20100024388 A | 3/2010 |

OTHER PUBLICATIONS

Nicolescu et al. "Polarization-insensitive, stacked, liquid crystal polarization grating bandpass filters" *Proc. SPIE 7934, Optical Components and Materials VIII* 7934(1):1-9 (Feb. 10, 2011).

Oh et al. "High-Throughput Continuous Beam Steering Using Rotating Polarization Gratings" *IEEE Photonics Technology Letters* 22(4):200-202 (Feb. 15, 2010).

Sasaki, T., et al., "Coupled-wave analysis of vector holograms: effects of modulation depth of anisotropic phase retardation," Applied Optics, vol. 49, No. 28, Oct. 1, 2010, pp. 5205-5211.

Crawford, G. et al, "Liquid-crystal diffraction gratings using polarization holography alignment techniques," Journal of Applied Physics 98, 123102, 2005, 10 pages.

Ono, H. et al., "Light Wave Propagation in Polarization Holograms Formed in Photoreactive Polymer Liquid Crystals," Japanese Journal of Applied Physics 47, 2008, pp. 3559-3563.

Ono, H. et al., "Light Wave Propagation and Bragg Diffraction in Thick Polarization Gratings," Japanese Journal of Applied Physics 47, 2008, pp. 7963-7967.

Ishiguro, M. et al., "Bragg-Type Polarization Gratings Formed in Thick Polymer Films Containing Azobenzene and Tolan Moieties," Langmuir 23, 2007, pp. 332-338.

Xu, M. et al., "Photoanisotropic polarization gratings beyond the small recording angle regime," Optic Express, vol. 18, No. 7, Mar. 29, 2010, pp. 6703-6721.

De Jong, T. et al., "Surface-relief and polarization gratings for solar concentrators," Optic Express, vol. 19, No. 16, Aug. 1, 2011, pp. 151127-15142.

Komanduri, R. et al., "Multi-twist retarders: broadband retardation control using self-aligning reactive liquid crystal layers," Optic Express, vol. 21, No. 1, Jan. 14, 2013, pp. 404-420.

Oh, C. et al., "Numerical analysis of polarization gratings using the finite-difference time-domain method," Physical Review A 76, 043815, 2007, 8 pages.

Bogdanov, A. et al., "Laser-induced holographic light scattering in a liquid-crystalline azobenzene-containing polymer," Physical Review E 85, 011704, 2012, 7 pages.

Shishido, A., "Rewritable holograms based on azobenzene-containing liquid-crystalline polymers," Polymer Journal 42, 2010, pp. 525-533.

Laffont, G. et al., "Tilted short-period fibre-Bragg-grating-induced coupling to cladding modes for accurate refractometry," Meas. Sci. Technol. 12, 2001, pp. 765-770.

Notification of Transmittal of the International Search Report and the Written Opinion of the International Searching Authority, or the Declaration, in corresponding PCT Application No. PCT/US2015/042860 dated Oct. 28, 2015 (13 pages).

\* cited by examiner

BRAGG LIQUID CRYSTAL POLARIZATION GRATINGS

CLAIM OF PRIORITY

This application claims priority from U.S. Provisional Patent Application No. 62/031,260 filed on Jul. 31, 2014 and entitled "Bragg Liquid Crystal Polarization Gratings," the disclosure of which is incorporated by reference herein in its entirety.

FIELD

The present invention relates to polarization gratings, and more particularly, to the fabrication of liquid crystal polarization gratings and related devices.

BACKGROUND

Polarization Gratings (PGs) are diffractive optical elements formed by patterning thin films with optical anisotropy. More specifically, a PG has a local optical axis that varies linearly (e.g., $\Phi(x)=\pi x/\Lambda$) along a direction that is coplanar with the optical axis itself (e.g., XY plane), and has a homogeneous anisotropy magnitude, among other features. This can provide optical properties that may be unique to PGs, including but not limited to high diffraction efficiency, limited diffraction orders, and/or polarization selectivity. Using photo-alignment and liquid crystal (LC) materials, PGs may be fabricated with high quality, in both switchable and polymerizable LCs. In the latter case, PGs may be formed as multiple sublayers of LCs with a single alignment layer. By adding chiral dopants to reactive mesogens, also called low-molecular weight polymerizable LCs (LCPs), a chiral twist in each layer may be achieved. This chiral twist can be used to tailor the bandwidth of high diffraction efficiency.

The interaction of light with diffraction gratings can be affected by a complex combination of both material and geometric parameters. It may be common in the field of diffraction gratings to use a dimensionless parameter Q to identify the regime of the optical behavior of a particular grating configuration:

$$Q = 2\pi \lambda d / \Lambda^2 n \qquad (1)$$

where $\lambda$ is the vacuum wavelength of light, d is the grating thickness, $\Lambda$ is the grating period of the optical element (i.e., pitch), and n is the average refractive index. In this framework, the Bragg regime can be defined as $Q>1$, the Raman-Nath regime can be defined as $Q<1$, and $Q\sim 1$ may refer to a mixed regime with properties of both.

Typical PGs may be configured in the Raman-Nath regime, i.e., a configuration roughly corresponding to the so-called paraxial approximation. In this regime, PGs can manifest high (~100%) diffraction efficiencies and optical behavior that can usually be described well by a concise analytical theory. As described in U.S. Pat. No. 7,692,759 to Escuti et al., a high diffraction arrangement may occur in this regime at the half-wave retardation condition, which may be achieved in a non-chiral uniaxially birefringent material at thickness $d=\lambda/2(n_e-n_o)=\lambda/2\Delta n$, where $\Delta n=(n_e-n_o)$ is the birefringence, and where $n_e$ and $n_o$ are the extra-ordinary and ordinary refractive indices, respectively. In other typical arrangements, the half-wave condition can be achieved by certain combinations of multiple chiral LC layers, as described for example in U.S. Pat. Nos. 8,305,523 and 8,339,566 to Escuti et al. When this half-wave condition is satisfied, PGs can typically theoretically diffract 100% into a single first order with circularly polarized input, and/or 50% into each first order with linearly or unpolarized light. In recent years, such PGs have been physically realized, with several groups reporting >99% efficiency (and essentially no haze), especially for PGs with a grating period $\Lambda$ much greater than the operational wavelength $\lambda$ with bulk LC materials.

SUMMARY

Embodiments of the present invention provide optical elements capable of high diffraction efficiencies at large diffraction angles.

According to some embodiments of the present invention, an optical element or apparatus for diffracting light includes at least one liquid crystal polarization grating having a grating period, thickness, and average refractive index such that the Bragg condition ($Q>1$) is attained for the wavelength of operation. For example, for an operational wavelength range of about 400 nm to about 1700 nm, the apparatus includes a plurality of stacked, liquid crystal sublayers having an aggregate thickness of about 100 nm to about 10000 nm, and a grating period of about 300 nm to about 5000 nm. In particular embodiments, for an operational wavelength range of about 1530 nm to about 1565 nm and a grating period of about 1000 nm, the apparatus may include a plurality of stacked, liquid crystal sublayers having respective thicknesses of about 100 nm to about 300 nm, and an aggregate thickness of about 6000 nm.

In some embodiments, the polarization grating may include multiple, stacked polymerized nematic liquid crystal sublayers provided on a substrate. The substrate may be transparent or reflective.

In some embodiments, each of the liquid crystal sublayers may have a thickness that is less than the grating period.

In some embodiments, the liquid crystal sublayers may have local optical axes, which may be defined by liquid crystal molecule orientations that are aligned at interfaces between the sublayers.

In some embodiments, the liquid crystal sublayers may comprise chiral layers having respective local optical axes that are rotated over respective thicknesses thereof. The chiralities of the liquid crystal sublayers, as well as the incidence angle and/or polarization of light incident thereon, can affect angles of diffraction of light output therefrom.

According to further embodiments of the present invention, an optical element includes a plurality of stacked birefringent sublayers configured to alter a direction of propagation of light passing therethrough according to the Bragg condition, and to alter a polarization of the light. The stacked birefringent sublayers respectively include local optical axes that vary along respective interfaces between adjacent ones of the stacked birefringent sublayers to define respective sublayer grating periods.

In some embodiments, the stacked birefringent sublayers have respective thicknesses that may be less than a wavelength of the light.

In some embodiments, the stacked birefringent sublayers may have respective thicknesses that are less than the respective grating periods and/or less than a grating period $\Lambda$ of the optical element defined thereby, and an aggregate thickness comprising a sum of the respective thicknesses may be greater than the respective grating periods and/or greater than the grating period $\Lambda$ of the optical element.

In some embodiments, the wavelength of the light comprises a wavelength $\lambda$ the respective grating periods define a period Λ of the optical element, the aggregate thickness comprises a thickness d, and an average refractive index of the stacked birefringent sublayers comprises a refractive index n such that a variable Q is greater than 1 for the wavelength λ where $Q=2\pi\lambda d/\Lambda^2 n$.

In some embodiments, the stacked birefringent sublayers may comprise a material having a birefringence of less than about 0.4.

In some embodiments, the stacked birefringent sublayers may respectively comprise liquid crystal sublayers having liquid crystal molecule orientations that define the local optical axes.

In some embodiments, the local optical axes of one or more of the stacked birefringent sublayers may be rotated over the respective thicknesses thereof to define respective twist angles.

In some embodiments, ones of the respective twist angles and/or respective thicknesses may be different among the stacked birefringent sublayers.

In some embodiments, the plurality of stacked birefringent sublayers may be configured to diffract the light into a zero order beam and a first order beam having a substantially same polarization, which is different than an incident polarization of the light.

In some embodiments, the plurality of stacked birefringent sublayers may be configured to diffract the light into the first order beam with a diffraction efficiency of about 94% or more responsive to receiving the light at an angle of incidence that is approximately equal to a Bragg angle.

In some embodiments, a difference between the different angles of propagation of the zero and first order beams may be greater than about 45 degrees, greater than about 60 degrees, or up to about 90 degrees, responsive to receiving the light at the angle of incidence that is approximately equal to the Bragg angle.

In some embodiments, the substantially same polarization of the zero order and first order beams may be an approximately circular polarization of a same handedness.

In some embodiments, a reflective element may be may be arranged or positioned to receive the zero order beam and/or the first order beam output from the stacked birefringent sublayers and reflect the zero order beam and/or the first order beam back theretoward.

In some embodiments, the reflective element may be configured to output light having a plurality of different polarizations responsive to receiving the zero order beam and/or the first order beam from the stacked birefringent sublayers.

In some embodiments, the respective grating periods of the stacked birefringent sublayers are less than the wavelength of the light.

In some embodiments, a transparent substrate may be optically coupled to the plurality of stacked birefringent sublayers. The plurality of stacked birefringent sublayers may be configured to diffract the light into the first order beam at an angle that is greater than a critical angle for total internal reflection (TIR) within the transparent substrate.

In some embodiments, the plurality of stacked birefringent sublayers may be first birefringent sublayers having respective first grating periods and may be configured to alter the direction of propagation of a first wavelength of the light passing therethrough according to the Bragg condition. A plurality of stacked second birefringent sublayers may be on the first birefringent sublayers and may be respectively configured to alter the direction of propagation of a second wavelength of the light passing therethrough according to the Bragg condition. The second birefringent sublayers may have respective local optical axes that vary along respective interfaces therebetween to define respective second grating periods. The first and second birefringent sublayers may be configured to diffract the first and second wavelengths of the light, respectively, into respective first order beams.

In some embodiments, the respective first order beams may have a substantially same propagation direction.

In some embodiments, the second grating periods, an aggregate thickness of the second birefringent sublayers, and/or an average refractive index of the second birefringent sublayers may differ from those of the first birefringent layers.

In some embodiments, the stacked birefringent sublayers may respectively comprise first and second side-by-side second regions having different local grating periods.

In some embodiments, the respective grating periods may be about 1000 nanometers or less, and wherein the stacked birefringent sublayers have respective thicknesses of about 100 nm to about 300 nm.

In some embodiments, the wavelength of the light may be about 400 nanometers (nm) to about 1700 nm.

In some embodiments, the stacked birefringent sublayers may have respective thicknesses that are less than or equal to half of the respective grating periods.

According to still further embodiments of the present invention, a diffractive optical element includes at least one liquid crystal layer having a thickness d (that is, a liquid crystal layer formed in a single step with a thickness d or a liquid crystal layer formed of multiple sublayers having a collective thickness d), an average refractive index n, and comprising liquid crystal molecule orientations that vary in a direction along a surface thereof to define a grating period Λ of the diffractive optical element such that a variable Q is greater than 1 for an operational wavelength λ of light, where $Q=2\pi\lambda d/\Lambda^2 n$.

In some embodiments, the grating period Λ of the diffractive optical element may be less than the operational wavelength λ of the light.

In some embodiments, the grating period Λ may vary within the at least one liquid crystal layer. For example, the at least one liquid crystal layer may include different sections or portions, each having a different local grating period within that section or portion. More generally, one portion of the at least one liquid crystal, layer may define a Bragg polarization grating with one set of parameters, while another portion of the at least one liquid crystal layer may have different Bragg polarization grating parameters, or may even have parameters corresponding to another type of element (e.g., a non-Bragg polarization grating).

In some embodiments, the at least one liquid crystal layer may be a plurality of stacked polymerized nematic liquid crystal sublayers, and respective thicknesses of the stacked polymerized liquid crystal sublayers may be less than the operational wavelength λ of the light.

In some embodiments, the respective thicknesses of the stacked polymerized nematic liquid crystal sublayers may be less than the grating period Λ of the diffractive optical element. The respective thicknesses of the stacked polymerized nematic liquid crystal sublayers may collectively define the thickness d, which is greater than the grating period Λ of the diffractive optical element and the operational wavelength λ of the light.

In some embodiments, the liquid crystal molecule orientations of one or more of the stacked polymerized nematic liquid crystal sublayers may be rotated over the respective thicknesses thereof to define respective twist angles φ, where the respective twist angles φ and/or the respective thicknesses may be different among the stacked polymerized nematic liquid crystal sublayers.

Some embodiments of the present invention thus include a plurality of stacked birefringent sublayers that are respectively configured to alter a polarization and direction of light passing therethrough, the sublayers having respective local optical axes that vary in a direction along respective interfaces between the sublayers to define respective grating periods, where the respective grating periods, respective thicknesses, and an average refractive index of the stacked birefringent sublayers define a Bragg condition for a wavelength of the light.

Other apparatus and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
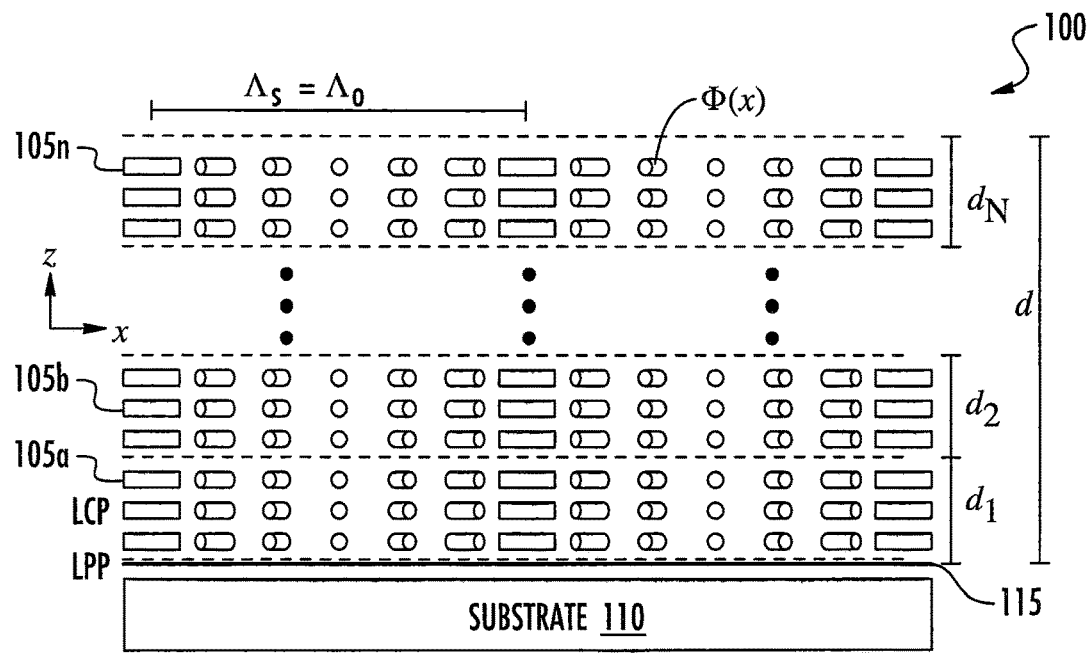
FIG. 1 is a diagram illustrating structure and parameters of a Bragg liquid crystal polarization grating (LCPG) according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as, illustrated in the figures. It will be understood that the spatially relative terms are intended, to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Some conventional PGs in the Raman-Nath regime may have a grating period $\Lambda$ that approaches $\lambda$ (i.e., $\Lambda \sim \lambda$), where the thickness may correspond roughly to the half-wave retardation condition. The diffraction angle $\theta$ for normal incidence may be defined as:

$$\sin(\theta) = \lambda/\Lambda \quad (2)$$

where, as $\Lambda$ approaches $\lambda$ ($\Lambda \sim \lambda$), $\theta$ becomes larger and larger and eventually 90°. When $\Lambda < \lambda$, $\theta$ becomes imaginary, light may waveguide within the grating. However, high diffraction efficiency at large diffraction angles (i.e., when $\Lambda$ approaches $\lambda$) may be either impossible or unfeasible. For example, according to some numerical simulations, high diffraction efficiency at large diffraction angles may be achieved by using materials with increasingly high birefringence; however, for $\Lambda$ approaching $\lambda$, the required birefringence may be unfeasibly high (i.e., $\Delta n > 0.4$). Other numerical simulations appear to support these findings, some of which may recognize that, when liquid crystals are used, the manufacture may be challenging because of the need for an unfeasibly high birefringence $\Delta n$. Likewise, it may be recognized that liquid crystal-based polarization gratings with $\Lambda \leq \lambda$ may not be realized experimentally, because even an ideal simulated case with $\Delta n \sim 0.59$, the highest predicted diffraction efficiency may be around 30%.

Conventional uses of polarization gratings (PGs) in the Bragg regime have been somewhat limited, perhaps because the smaller periods of PGs may be harder to fabricate and/or may require more complex theoretical analysis. However, this regime may be important since some applications may prefer large diffraction angles to increase the angular aperture of the optical system. Such applications may include telecommunications, displays, imaging sensors, and non-mechanical laser beam steering.

Some embodiments of the present invention may arise from realization that conventional uses of PGs in the Bragg regime typically focus on the case of where the grating period $\Lambda$ is greater than the wavelength $\lambda$ of the incident light (also referred to herein as the operational wavelength), that is, where $\Lambda > \lambda$ (e.g., where $\lambda$ approaches $\Lambda$). In an early example of Bragg PGs, an experimental study employed a photoactive polymer, based on bulk photo-induced molecular realignment with azobenzene moieties, to achieve ≥90% diffraction efficiency, with $\Lambda = 2$ μm, $d = 100$ μm, and $\lambda = 633$ nm. However, a limitation of this class of materials may be the manifestation of haze (i.e., scattering) and absorption for thick films, and much thicker films may be required for Bragg PGs with a smaller $\Lambda$. For example, to reach the same Q in the prior case but with $\Lambda = \lambda = 633$ nm, Equation (1) shows that the thickness with the same materials would need to be a factor of $(2/0.633)^2 = 10$ larger, or $d = 1$ mm, which is a thickness at which haze and absorption would likely make the films unusable.

While some numerical simulation and theoretical analysis may indicate that diffraction efficiency as high as 100% can be possible in the Bragg regime, this may typically be observed when the thickness is much greater than the half-wave retardation thickness, and when light is obliquely incident. However, the above simulation and analysis provides little or no indication about how to fabricate PGs with good diffraction efficiency and low loss. As such, conventional PGs may not use liquid crystals (LCs) for large diffraction angles, in part because they may be unfeasibly or impossibly thick, and/or require materials with impossibly high birefringence $\Delta n$, which indicates a difference in the extra-ordinary $n_e$ and ordinary $n_o$ refractive indices of the liquid crystal material. Furthermore, conventional Bragg PGs may not recognize the possibility of using bulk LC materials.

Embodiments of the present invention may address the above and/or other problems by providing PGs with both large diffraction angles $\theta$ of up to about 90° (i.e., $\lambda$ approaching $\Lambda$) and high efficiency. Bragg PGs formed with LC materials having grating period $\Lambda$, thickness d, and/or average refractive index n selected such that the Bragg condition ($Q > 1$) is attained for the wavelength of operation may make this possible, and may not be limited by material birefringence in the same way as Raman-Nath PGs. Other problems addressed by embodiments of the present invention include absorption (etc.) loss and/or fabrication difficulties associated with conventional Bragg PGs at any diffraction angle, whether small or large. Bragg liquid crystal polarization gratings (LCPGs) according to some embodiments of the present invention are transparent and may become more easily fabricated because they can employ conventional LC materials and processes.

More specifically, embodiments of the present invention can employ bulk LC materials and multiple sublayers (which may have respective thicknesses that are less than the operational wavelength of the light to be passed therethrough), individually coated and polymerized, to achieve the large thicknesses required for the Bragg regime, and thereby sidestep the limitations of conventional methods and materials in the prior art to physically realize a low loss and high quality Bragg PG that manifests high diffraction efficiency (for instance, approximately or up to 100%).

FIG. 1 illustrates a Bragg LCPG 100 according to some embodiments of the present invention. The Bragg LCPG 100 includes a substrate 110, a photoalignment layer 115, and a plurality of stacked birefringent sublayers having respective local optical axes that vary in a direction along the interfaces therebetween (illustrated as bulk nematic LC layers 105a, 105b, . . . 105n), each of which may be coated and polymerized individually, and whose relevant parameters are arranged or selected so that Q>1. In the example of FIG. 1, the liquid crystal molecule orientations in each of the layers 105a, 105b, . . . 105n define local optical axes that vary along the respective interfaces between the layers 105a, 105b, . . . 105n, but are uniform over the respective thicknesses of the layers 105a, 105b, . . . 105n. The substrate 110 may be rigid or flexible, and/or transparent or reflective. The photoalignment layer 115 can be a linearly photopolymerizeable polymer (LPP), which has been patterned such that the alignment direction follows $\Phi(x)=\pi x/\Lambda$.

The bulk nematic LC layers 105a, 105b, . . . 105n can be described as polymerized reactive LC monomer layers, and, for convenience and consistency, may be referred to herein as LC polymer (LCP) sublayers. Each thin LCP sublayer 105a, 105b, . . . 105n has its own thickness ($d_1, d_2, \ldots d_N$), which collectively define the overall or total Bragg PG thickness d ($=d_1+d_2+ \ldots +d_N$) of Equation (1), and has local optical axes aligned at interfaces with the sublayers above and below. Note that two or more sublayers 105a, 105b, . . . 105n may each have the same thickness, but embodiments of the present invention are not so limited, and may include sublayers 105a, 105b, . . . 105n with different thicknesses. Likewise, each LCP sublayer 105a, 105b, . . . 105n has a respective sublayer or surface grating period $\Lambda_s$, which may define the overall optical grating period $\Lambda_o$ for the element 100 (more generally referred to herein as the optical element grating period $\Lambda$). While the optical element grating period $\Lambda$ is illustrated as being equal to the sublayer grating period $\Lambda_s$ in the embodiment of FIG. 1 (i.e., $\Lambda_o=\Lambda_s$), the optical element grating period $\Lambda$ may be less than or equal to the sublayer grating period $\Lambda_s$ (i.e., $\Lambda_o \leq \Lambda_s$) in other embodiments. Note furthermore that each sublayer thickness $d_1, d_2, \ldots, d_N$ may be less than the operational wavelength $\lambda$ and/or the optical element grating period $\Lambda$ (for example, less than or equal to about half of the optical element grating period, i.e., d #$\leq \Lambda/2$), to facilitate high quality LC alignment (c.f., U.S. Pat. No. 8,064,035 to Escuti et al., the disclosure of which is incorporated by reference herein), while the aggregate or total Bragg PG thickness d may be greater than the optical element grating period $\Lambda$ and/or the operational wavelength $\lambda$ in some embodiments. More generally, other parameters being constant, the thickness d required for the Bragg effect may increase as the optical element grating period $\Lambda$ increases.

It should be noted that in this context, LCP layers are distinct from conventional liquid crystalline polymers. The LCP thin films employed in some embodiments of the present invention include low-molecular-weight reactive LC molecules, which are aligned by characteristics of the surface on which they are coated or otherwise formed, and are subsequently polymerized into a rigid polymer network. In particular, the periodic pattern of the Bragg PG can be recorded into the surface of a photoalignment layer, rather than the LCP layer directly. Conversely, many conventional liquid crystalline polymers may be high-molecular-weight polymers with liquid crystalline components, and the periodic pattern of the Bragg PG is typically directly recorded into the material, for instance, via photoinduced molecular realignment.

Figure 2:
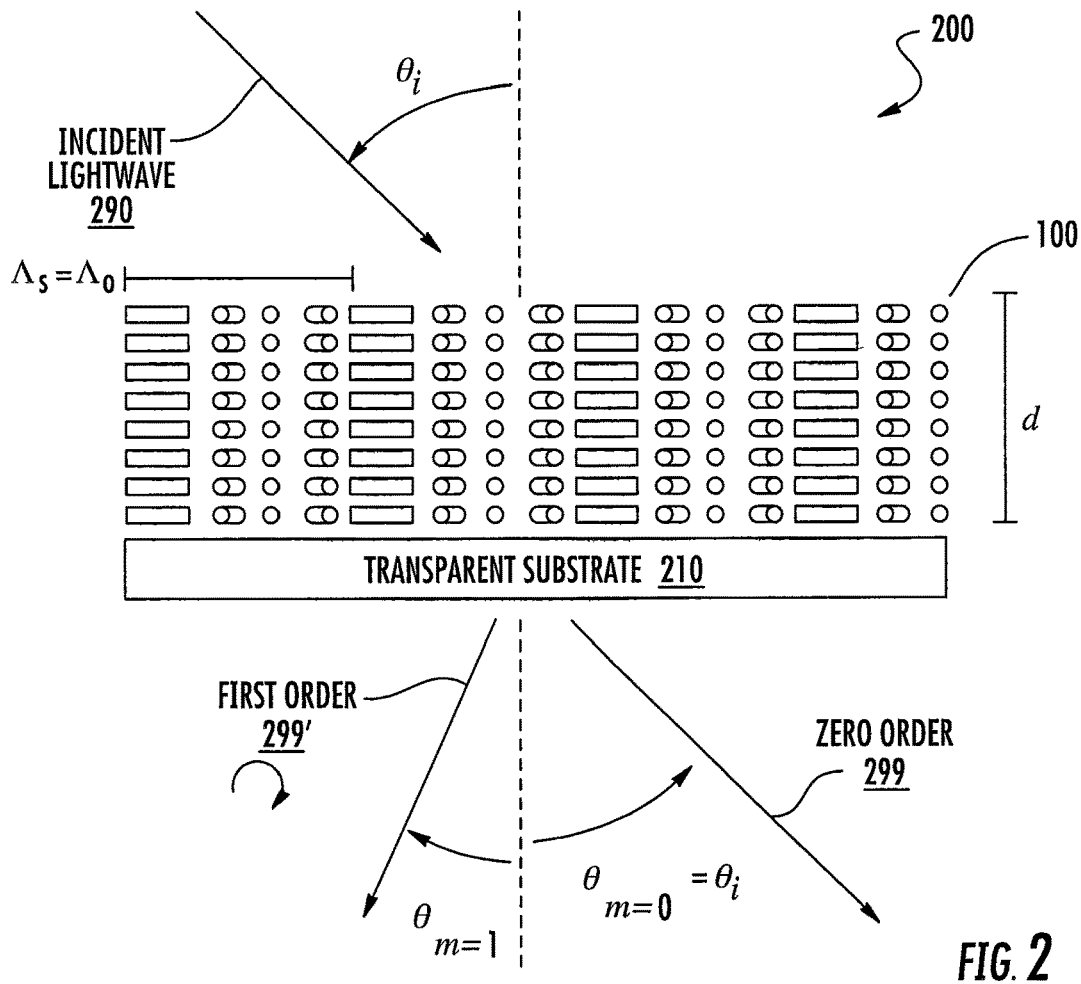
FIG. 2 is a diagram illustrating lightwave behavior with a transmissive Bragg LCPG according to some embodiments of the present invention.

FIG. 2 shows an optical element 200 illustrating how the Bragg LCPG 100 of FIG. 1 operates when formed or mounted on a transparent substrate 210 (which may be different from the substrate 110 of FIG. 1). Apart from parasitic reflections and leakages, a lightwave 290 incident with angle $\theta_i$ will be split into only (or substantially) two diffraction orders 299, 299' by the Bragg LCPG 100, corresponding to the zero (m=0) and first (m=1) orders, along the angles $\theta_{m=0}$ and $\theta_{m=1}$, respectively, when the incident angle $\theta_i$ of the light 290 satisfies the Bragg angle relationship $\theta_i = \theta_B = \sin^{-1}(\lambda/(2\Lambda))$, where is $\theta_B$ called the Bragg angle. According to the notation in FIG. 2, $\sin \theta_{m=1} = \sin \theta_i - \lambda/\Lambda = -\lambda/(2\Lambda)$, following the traditional diffraction equation. In other words, $\theta_{m=1} = -\theta_B$ meaning that the incident angle $\theta_{m=0}$ and the diffraction angle $\theta_{m=1}$ of the first order output beam 299' are identical to the Bragg angle $\theta_B$, but the diffraction angle $\theta_{m=1}$ of the first order output beam 299' is opposite in direction (relative to a direction perpendicular to the element 200). The diffraction angle $\theta_{m=0}$ of the zero order output beam 299 is equal to the incident angle $\theta_i$ relative to a direction perpendicular to the element 200. Furthermore, the grating parameters (i.e., $\Lambda$, d, and $\Delta n$) may be chosen for improved or optimal diffraction efficiency given the incident lightwave parameters (i.e., $\theta_i$ and $\lambda$). In some embodiments (e.g., where the Bragg LCPG 100 is fully diffracting), the output lightwaves or beams 299, 299' can have substantially the same circular polarizations, and their relative efficiency may be determined in part by the incident polarization. In particular, when the incident lightwave 290 has circular polarization and is input along the so-called Bragg angle, up to 100% diffraction efficiency into the first order 299', with the opposite circular polarization, is theoretically possible. In other embodiments (e.g., where the Bragg LCPG 100 is partially diffracting, such as 50% efficient), the first order output beam 299' may be circularly polarized, while the zero order output beam 299 may have an elliptical, non-circular polarization. Bragg LCPGs as described herein thus alter both the polarization and the propagation direction of the incident light.

As a representative example of the embodiment of FIG. 2, a Bragg LCPG for the wavelength $\lambda=1550$ nm was fabricated on a transparent glass substrate with anti-reflection coatings on one side. The grating pitch for the optical element was chosen to be $\Lambda=1$ µm or 1000 lines/mm, that is, such that the grating pitch or period $\Lambda$ is less than the operational wavelength $\lambda$. The LPP material LIA-COO1 (DIC Corporation Japan), was used, which was exposed using a PG holographic lithography method of interfering two coherent UV laser beams (355 nm) with orthogonal circular polarizations. For the LCP, RMS03-001C (Merck Chemicals Ltd., with $\Delta n \sim 0.1$ and $n \sim 1.57$ at 1550 nm) was used. Approximately 30 thin layers of this LCP (with respective thicknesses of 216 nm, which is less than the optical element grating period $\Lambda$ and the operational wavelength $\lambda$) were spin coated on the LPP layer, using techniques similar to those reported, for example, in "*Multi-twist retarders: Broadband retardation control using self-aligning reactive liquid crystal layers*" to Komanduri et al., Optics Express 21, 404-420 (2013). A total thickness d~6.5 µm (which represents a sum of the thicknesses of the 30 LCP sublayers) was selected to increase or maximize the diffraction efficiency. Some embodiments of Bragg LCPGs described herein may have a total thickness d of up to about 20 μm. A second transparent glass substrate was glued onto the LCP to protect the thin film and reduce or minimize air-glass reflection losses. For this example, Q~40, well into the Bragg regime.

Figure 3A:
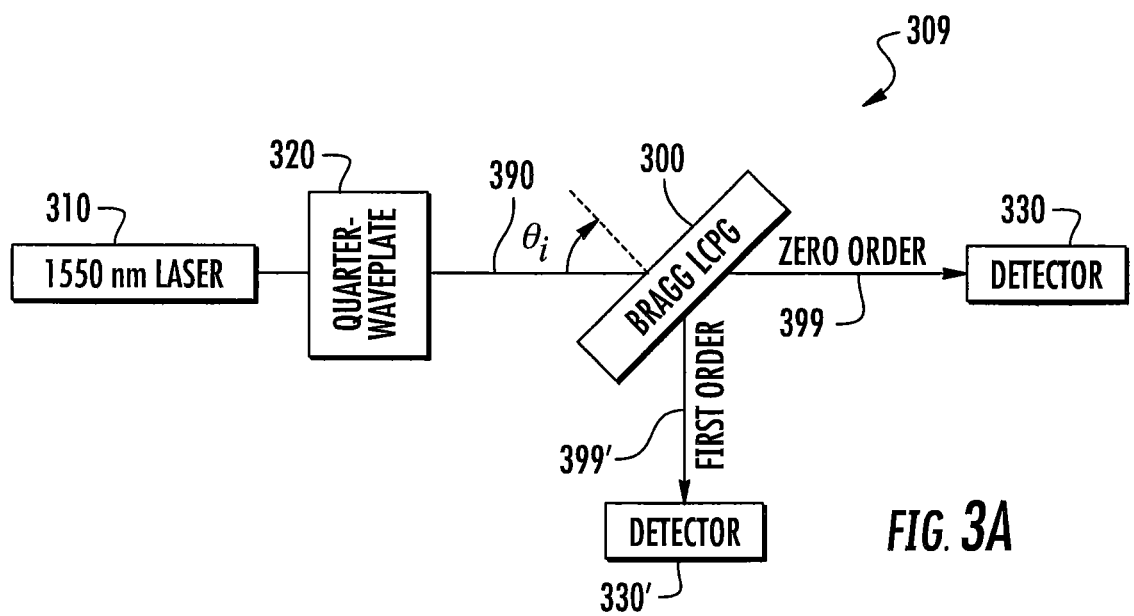
FIG. 3A is a diagram illustrating a setup for a transmissive Bragg LCPG diffraction efficiency measurement according to some embodiments of the present invention.

FIG. 3A shows a measurement setup 309 used to characterize the Bragg LCPG in the above-described example. Linearly polarized light from a 1550 nm laser 310 was passed through a Quarter-Wave Plate (QWP) 320 to adjust the polarization state to provide circularly polarized light 390, which was provided to the Bragg LCPG 300 at an incident angle $\theta_i$. The angle $\theta_i$ was varied by rotating the sample Bragg LCPG 300. The amount of light diffracted in the zero order 399 and the first order 399' were measured by using photo-detectors 330, 330'.

Figure 3B:
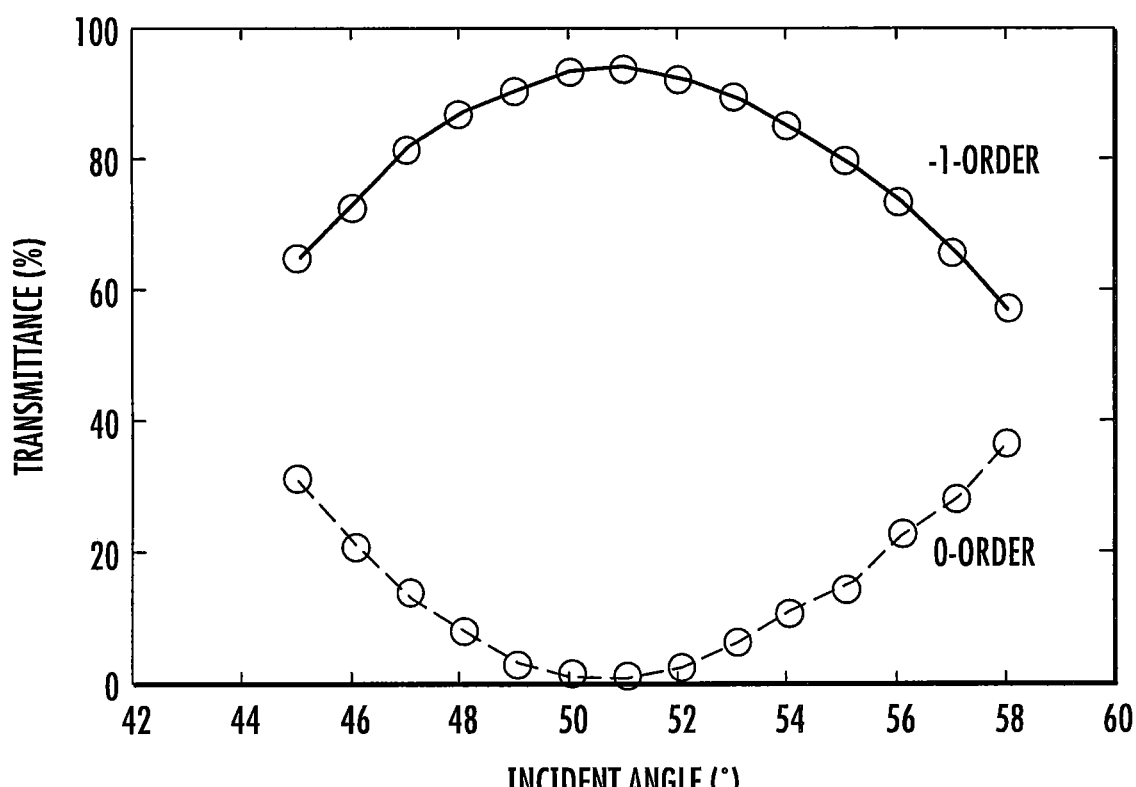
FIG. 3B is a graph illustrating measured transmittance from a transmissive Bragg LCPG fabricated according to some embodiments of the present invention.

FIG. 3B shows the data measured for the transmissive sample Bragg LCPG 300 discussed above at various incident angles. As shown in FIG. 3B, the zero order transmittance reached a minimum when the input light 390 was circularly polarized. In this configuration, as the incident angle $\theta_i$ was varied, the absolute minimum in the zero order was measured at 51°, which is very close to the Bragg angle calculated as $\sin^{-1}(\lambda/(2\Lambda))=\sin^{-1}(1.55/2)\sim51°$. As seen in FIG. 3B, <1% of the incident light was observed in the 0-order at this angle (51°), with ~94% of the incident light 390 diffracted into the first order. The ~4% loss may be mainly attributed to the residual reflection of the air-glass interfaces, which included anti-reflection coatings that were selected or optimized for normal incidence. By normalizing out this effect, ~99% diffraction efficiency (=0.94/(0.94+0.01)) was achieved in this measurement. Not only is this a validation of Bragg diffraction with LCPGs, these results meet or exceed those observed from conventional Bragg gratings (i.e., non-PG types) and the prior art Bragg PGs formed according to different methods and materials. Additionally, the diffraction efficiency of both orders 399, 399' can be polarization sensitive. As the polarization state of the incident light 390 was varied between the orthogonal circular polarizations (by rotating the QWP 320), substantially all of the power shifted from the first order 399' to the zero order 399. The polarization contrast ratio (defined as the maximum-to-minimum power in these orders) was measured to be ~130:1 for both orders 399, 399'. Also note that the polarization states of both the zero order 399 and first order 399' were measured and confirmed to be circular and of the same handedness.

Figure 4:
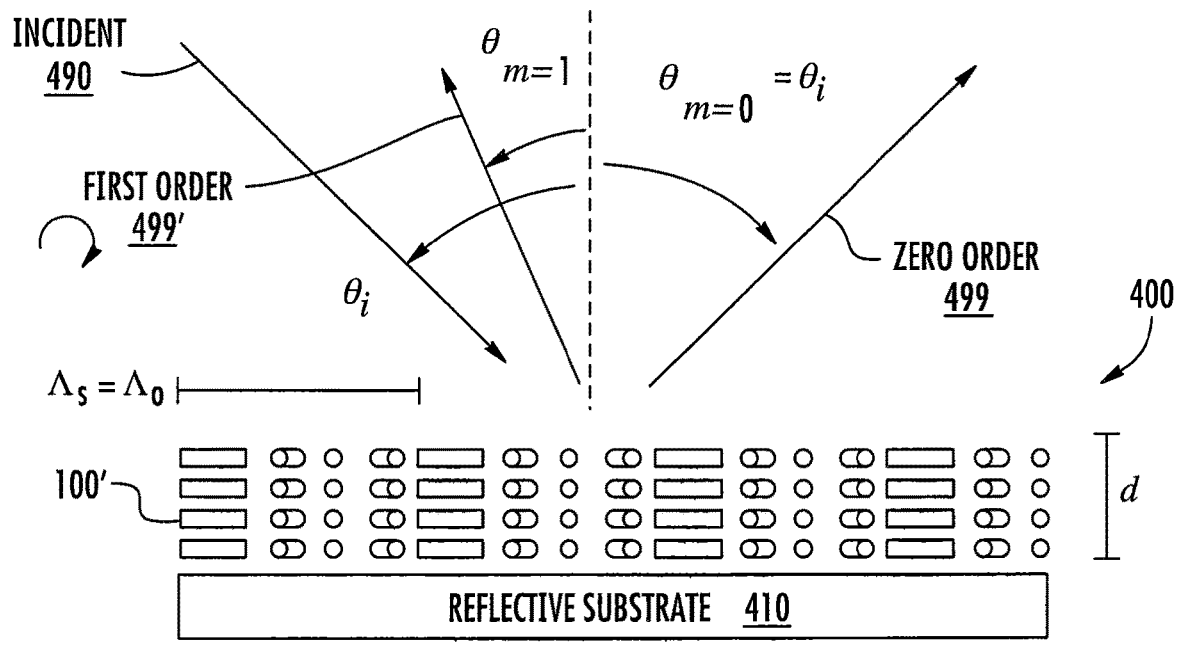
FIG. 4 is a diagram illustrating lightwave behavior with a reflective Bragg LCPG according to some embodiments of the present invention.

An optical element 400 including a Bragg LCPG arrangement according to further embodiments of the present invention is shown in FIG. 4, which is a reflective version of the embodiment 200 of FIG. 2. A Bragg LCPG layer 100' similar to FIG. 1 is formed or mounted on a reflective substrate 410, such as a metallic mirror or semiconductor, where the total thickness d is approximately half the thickness of the LCPG layer 100 of FIG. 2. An incident lightwave 490 behaves in similarly as in FIG. 2, except that all angles of the output light or beams 499, 499' are on the same side of the element 400 due to reflection by the reflective substrate 410. That is, the diffraction angles $\theta_{m=0}$ and $\theta_{m=1}$ corresponding to the zero (m=0) and first (m=1) order output light beams 499 and 499', respectively, are equal but opposite to that shown in FIG. 2. Because the lightwaves in this embodiment must pass through the LCPG layer 100' twice, the total thickness d of the LCPG 100' should be chosen approximately half of the thickness of the prior case.

Figure 5A:
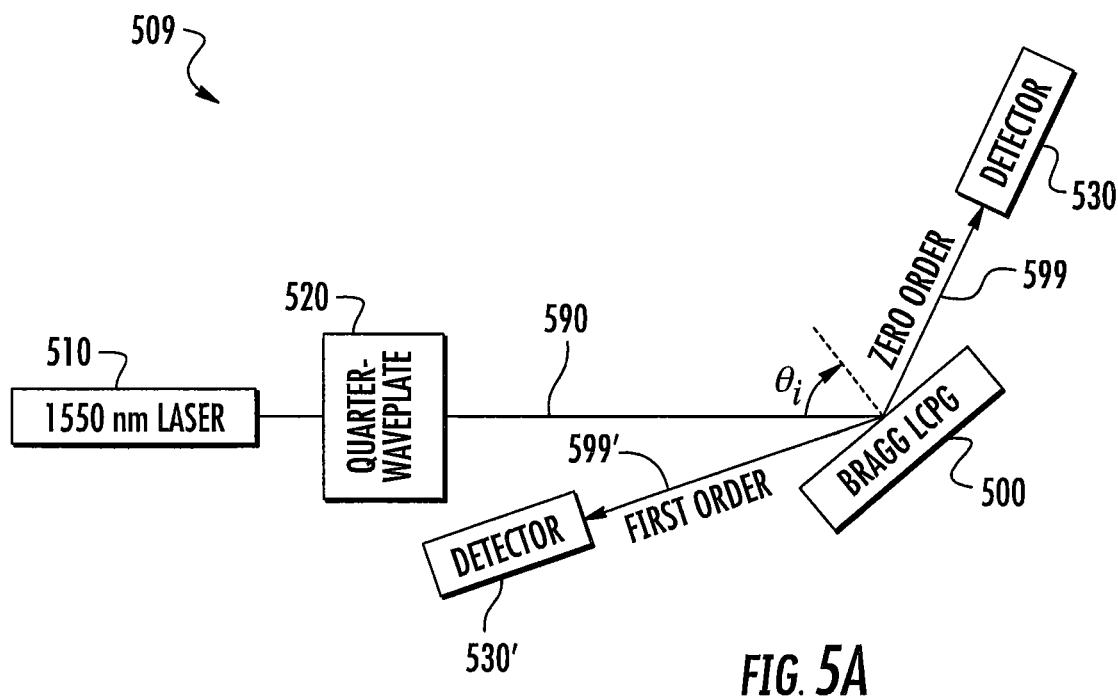
FIG. 5A is a diagram illustrating a setup for a reflective Bragg LCPG diffraction efficiency measurement according to some embodiments of the present invention.
Figure 5B:
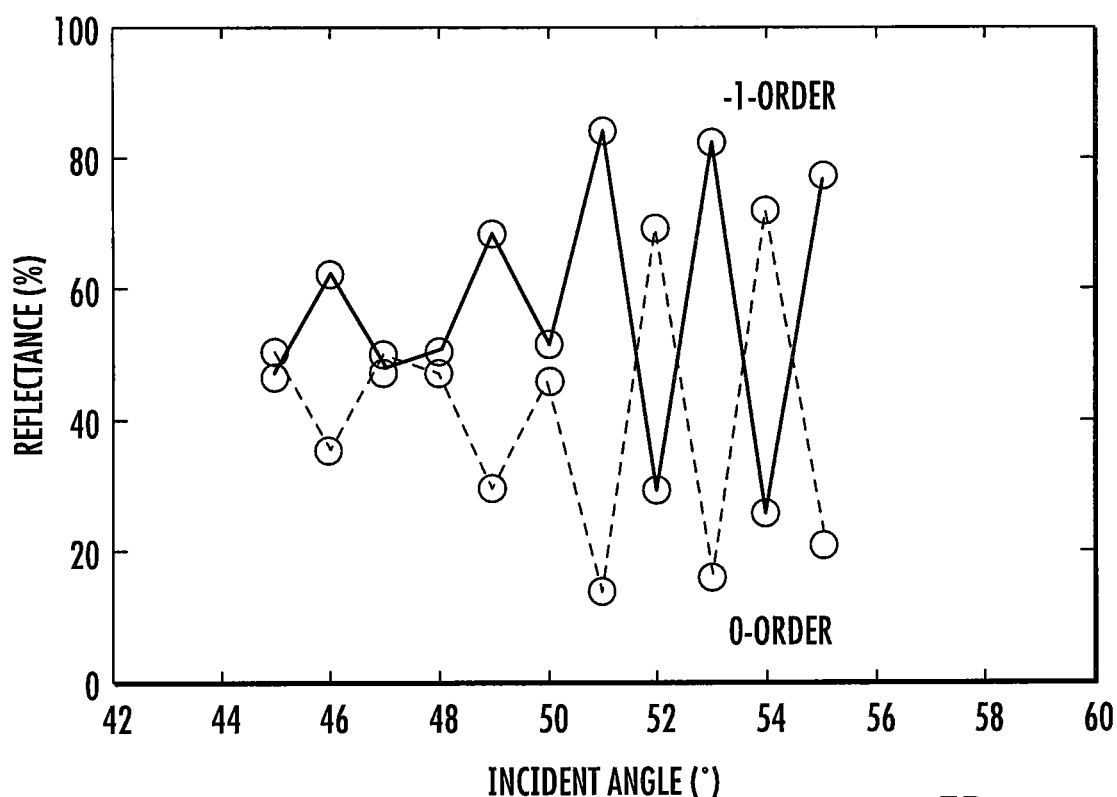
FIG. 5B is a graph illustrating measured reflectance from a reflective Bragg LCPG fabricated according to some embodiments of the present invention.

As a representative example of the embodiment 400 of FIG. 4, a Bragg LCPG for the wavelength λ=1550 nm was fabricated on a transparent glass substrate with anti-reflection coatings on one side. All parameters, materials, and fabrication methods were similar or identical to that of the previous representative example, except for a total thickness d=3 which was achieved by coating approximately 15 LCP sublayers. The thin film was then laminated to an aluminum mirror. FIG. 5A shows the measurement setup 509 to evaluate the Bragg LCPG sample 500, and FIG. 5B shows the zero and first order reflectance measured at different incident angles. In particular, linearly polarized light from a 1550 nm laser 510 was passed through a Quarter-Wave Plate (QWP) 520 to adjust the polarization state to provide circularly polarized light 590, which was provided to the Bragg LCPG 500 at an incident angle $\theta_i$. The angle $\theta_i$ was varied by rotating the sample Bragg LCPG 500. The amount of light diffracted in the zero order 599 and the first order 599' were measured by using photo-detectors 530, 530'. In contrast to the previous example with respect to the embodiment of FIG. 2, the data illustrated in FIG. 5B shows strong oscillation as the incidence angle is varied. Nevertheless, the global minimum in the zero order (~13%) was observed at the same Bragg angle of 51°, at which the maximum reflectance occurred into the first order (~83%). This corresponds to a 86% diffraction efficiency (=0.831(0.83+0.13)). While this is not as high as possible (since the LCP thickness may have been slightly too thin in this case), it nevertheless is a demonstration of Bragg diffraction from the LCPG.

Figure 6:
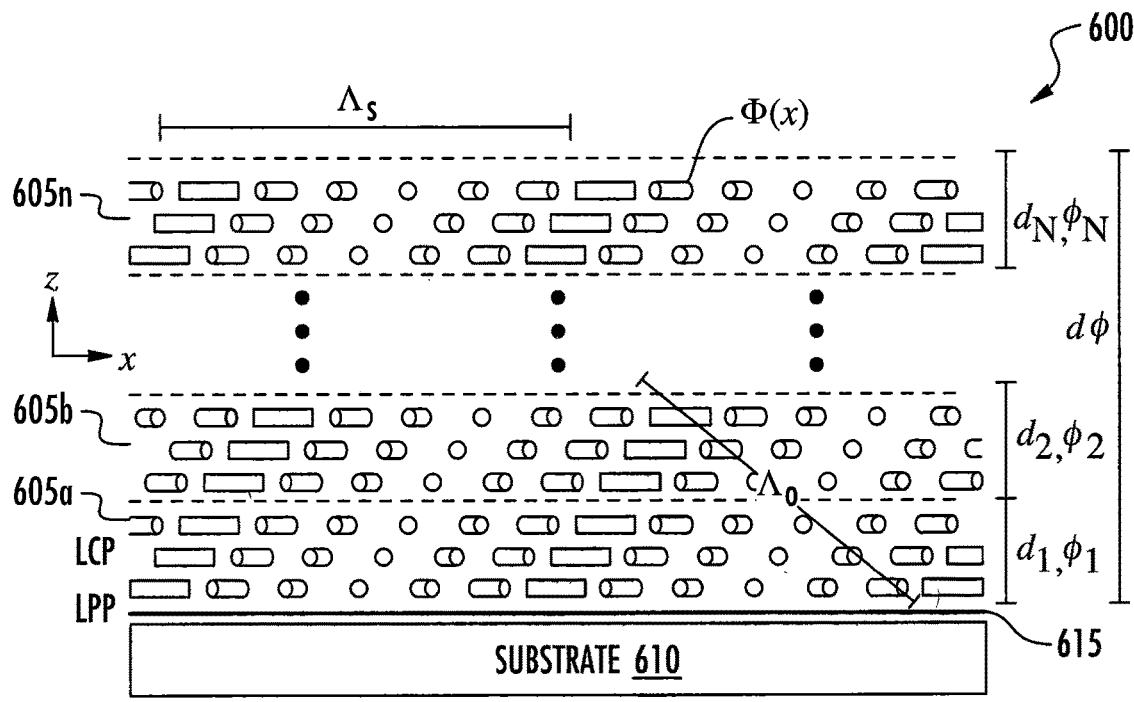
FIG. 6 is a diagram illustrating lightwave behavior with a slanted Bragg LCPG according to some embodiments of the present invention.

A Bragg LCPG 600 according to yet further embodiments of the present invention is shown in FIG. 6, which is similar to the embodiment 100 in FIG. 1, except for the LCP material and resulting structure. In this case, a polymerizable chiral nematic LC mixture is employed as the LCP, which leads to a helical twist in the z direction. Therefore, each thin LCP sublayer 605a, 605b, . . . 605n has its own thickness ($d_1, d_2, \ldots, d_N$), as well as its own chiral twist ($\phi_1, \phi_2, \ldots, \phi_N$) adding up to a total twist of $\phi$ for the overall element 600. In other words, the liquid crystal molecule orientations of one or more of the sublayers 605a, 605b, . . . 605n define local optical axes vary not only along the respective interfaces between the sublayers 605a, 605b, . . . 605n, but also vary over the respective thicknesses $d_1, d_2, \ldots, d_N$ of the sublayers 605a, 605b, . . . 605n to define respective twist angles $\phi_1, \phi_2, \ldots, \phi_N$. This also achieves a "slanted" Bragg LCPG, analogous to the angular slant of the periodic structures in some conventional slanted Bragg gratings. Note that the sublayers 605a, 605b, . . . 605n may each have the same thickness and twist, but embodiments of the present invention are not so limited, and may include sublayers 605a, 605b, . . . 605n with different thicknesses and/or twists. Note furthermore that each sublayer thickness may be less than the operational wavelength λ and/or the grating period Λ (i.e., d #≤Λ/2), to facilitate high quality LC alignment (c.f., U.S. Pat. No. 8,064,035 to Escuti et al.). More particularly, each LCP sublayer 605a, 605b, . . . 605n has a respective sublayer or surface grating period $\Lambda_s$, which defines the overall optical grating period $\Lambda_o$ for the element 600 (also referred to as the optical element grating period Λ). The optical element grating period Λ is less than the sublayer grating period $\Lambda_s$ (i.e., $\Lambda_o<\Lambda_s$) in the slanted Bragg LCPG shown in the embodiment of FIG. 6, but may be equal to the sublayer grating period $\Lambda_s$ (i.e., $\Lambda_o=\Lambda_s$) in other embodiments.

Figure 7:
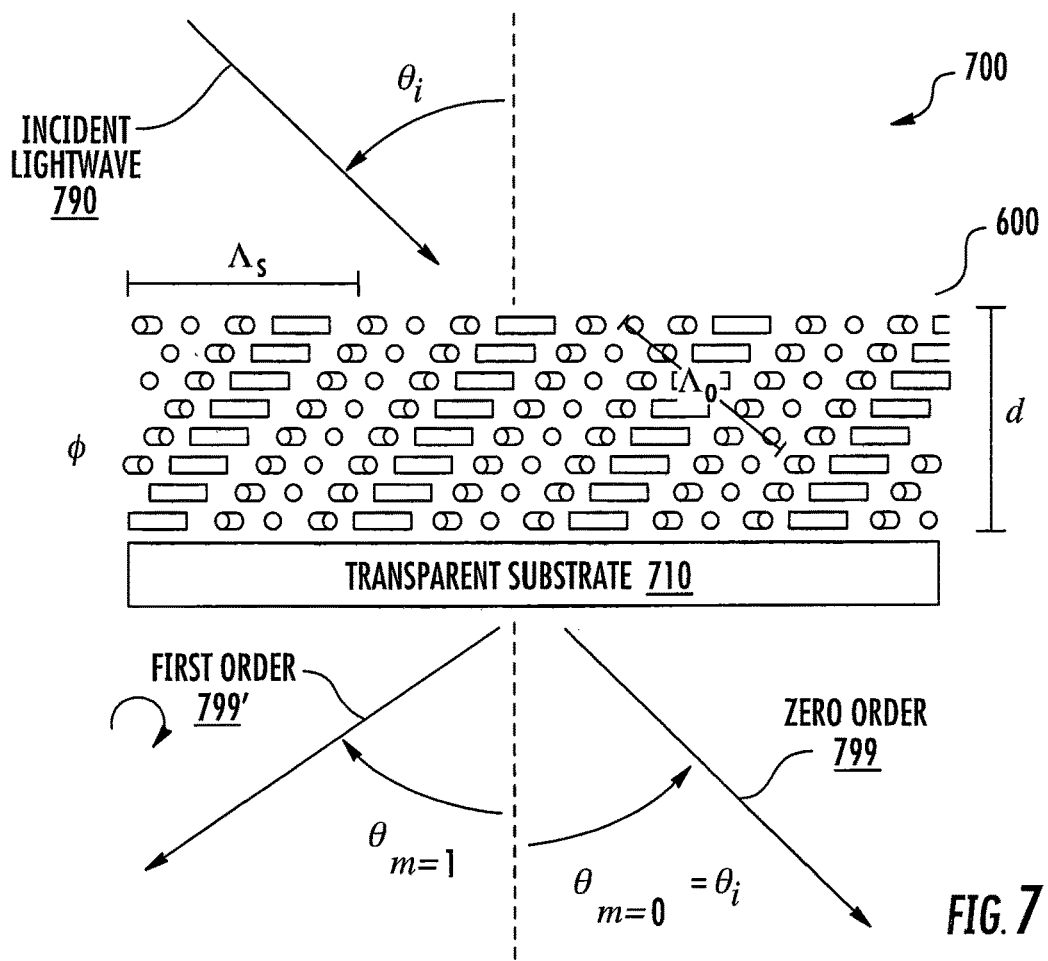
FIG. 7 is a diagram illustrating lightwave behavior with a transmissive slanted Bragg LCPG according to some embodiments of the present invention.
Figure 8:
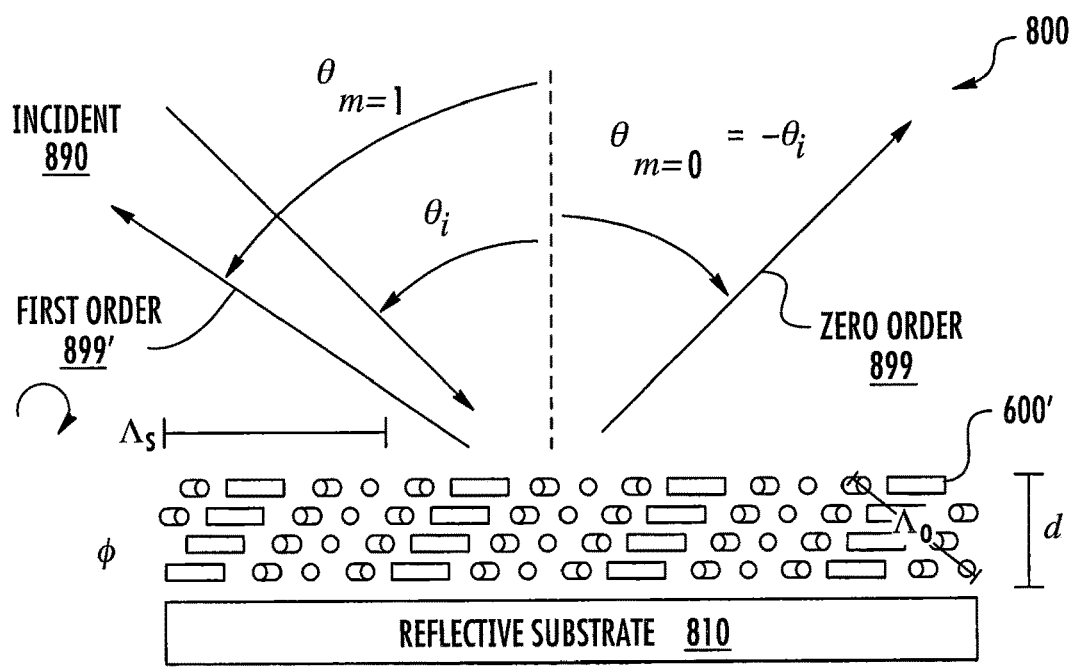
FIG. 8 is a diagram illustrating lightwave behavior with a reflective slanted Bragg LCPG according to some embodiments of the present invention.

Representative examples of the embodiment of FIG. 6 are illustrated in FIGS. 7 and 8, where the slanted Bragg LCPG 600 of FIG. 6 diffracts the first order into a different angle $\theta_m=1$ (c.f., FIGS. 2 and 3). This slant is achieved via the spontaneous helical twisting action of the chiral nematic LCP material itself, and provides additional control over the incident Bragg angle and/or the first order diffraction angle, allowing it to be modified to be larger or smaller compared to an otherwise equivalent unslanted (i.e., non-chiral) version. Chiral molecules may be added to a non-chiral nematic LC to control the twist angle precisely, as described, for example, in U.S. patent application Ser. No. 12/596,189 (now U.S. Pat. No. 8,339,566) to Escuti et al. entitled "LOW-TWIST CHIRAL LIQUID CRYSTAL POLARIZATION GRATINGS AND RELATED FABRICATION METHODS", the disclosure of which is incorporated by reference herein. Note that when sublayers have different chiral twists, it is possible to control additional aspects of the Bragg LCPG, behavior, including bandwidth and angular response, as described in U.S. patent application Ser. No. 13/646,166 to Escuti et al. entitled "MULTI-TWIST RETARDERS FOR BROADBAND POLARIZATION TRANSFORMATION AND RELATED FABRICATION METHODS," the disclosure of which is incorporated by reference herein.

In particular, the optical element 700 of FIG. 7 illustrates operation of the Bragg LCPG 600 of FIG. 6 when formed or mounted on a transparent substrate 710. As shown in FIG. 7, a lightwave 790 incident with angle $\theta_i$ is split into only (or substantially) two diffraction orders 799, 799' by the Bragg LCPG 600, corresponding to the zero (m=0) and first (m=1) orders, along the angles $\theta_{m=0}$ and $\theta_{m=1}$, respectively.

The optical element 800 of FIG. 8 illustrates operation of a Bragg LCPG 600' similar to FIG. 6 when formed or mounted on a reflective substrate 810, such as a metallic mirror or semiconductor. Because the lightwaves in this embodiment must pass through the LCPG layer 600' twice, the total thickness d of the LCPG layer 600' is approximately half the thickness of the LCPG layer 600 of FIG. 7. An incident lightwave 890 behaves in similarly as in FIG. 7, except that all angles of the output light or beams 899, 899' are on the same side of the element 800 due to reflection by the reflective substrate 810.

Figure 9:
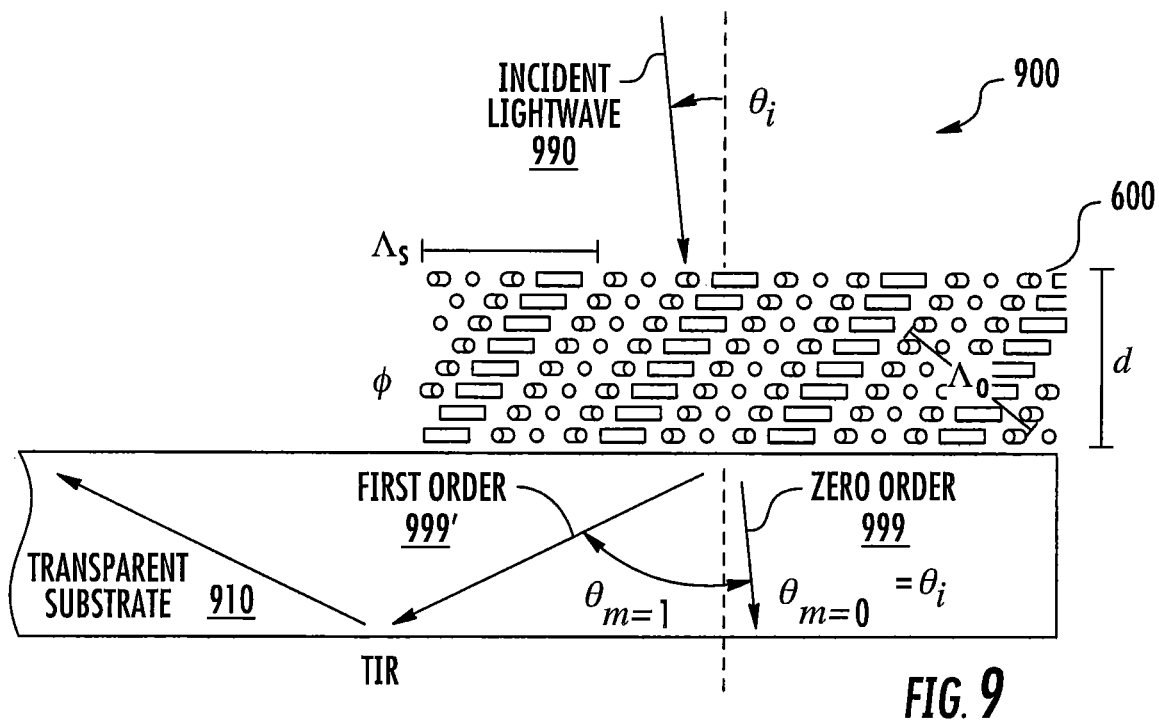
FIG. 9 is a diagram illustrating lightwave behavior with a transmissive slanted Bragg LCPG configured to achieve total internal reflection into a waveguide according to some embodiments of the present invention.

An optical element 900 including a Bragg LCPG arrangement according to still further embodiments of the present invention is shown in FIG. 9, where a slanted Bragg LCPG 600 of FIG. 6 is optically coupled to a transparent substrate 910 and where the first order diffraction angle $\theta_{m=1}$ of the first order light output beam 999' within that substrate 910 is greater than the critical angle and results in total internal reflection (TIR). This is sometimes called waveguide coupling, since the input lightwave 990 is being directed into modes of the waveguide that support TIR. There are various ways to achieve optical coupling, including but not limited to, forming the Bragg LCPG 600 directly on the substrate 910, or forming the Bragg LCPG 600 on a different substrate and subsequently laminating it to the final substrate 910 where TIR occurs. Note that the inverse behavior occurs with this same structure—if an incident lightwave or beam is already waveguiding inside the substrate 910 at the appropriate angle and with the appropriate wavelength, then the slanted Bragg LCPG 600 can diffract it out of the substrate. This is sometimes called out-coupling. Waveguide in-coupling and out-coupling with Bragg LCPGs is useful in many applications, including but not limited to planar lightwave circuits, fiber optic couplers, distributed feedback lasers, optical sensors, near-to-eye and heads-up-displays, turning films for backlights (etc), and solar concentrators. The diffraction angle $\theta_{m=0}$ of the zero order output beam 999 is equal to the incident angle $\theta_i$ relative to a direction perpendicular to the element 900.

As a representative example of the embodiment of FIG. 9, a slanted Bragg LCPG for the wavelength λ=1550 nm was fabricated on a transparent glass substrate with anti-reflection coatings on one side. All parameters, materials, and fabrication methods were similar or identical to that of the representative example with respect to the embodiment of FIG. 2, except for the use of a chiral nematic LCP material. This chiral nematic LC was prepared by adding a small amount (2% by weight) of chiral dopant CB 15 (Merck Chemicals Ltd.) into the LCP base material RMS03-001C. It is estimated that this created a twist ϕ=400°–500°, with a similar thickness d (~6 μm). Note that the overall grating pitch for the optical element remained the same, as Λ=1 μm or 1000 lines/mm. These parameters were selected to achieve TIR of the first order diffraction into a glass substrate (refractive index~1.5) when the input light is incident from a direction nearly normal to the surface.

Figure 10A:
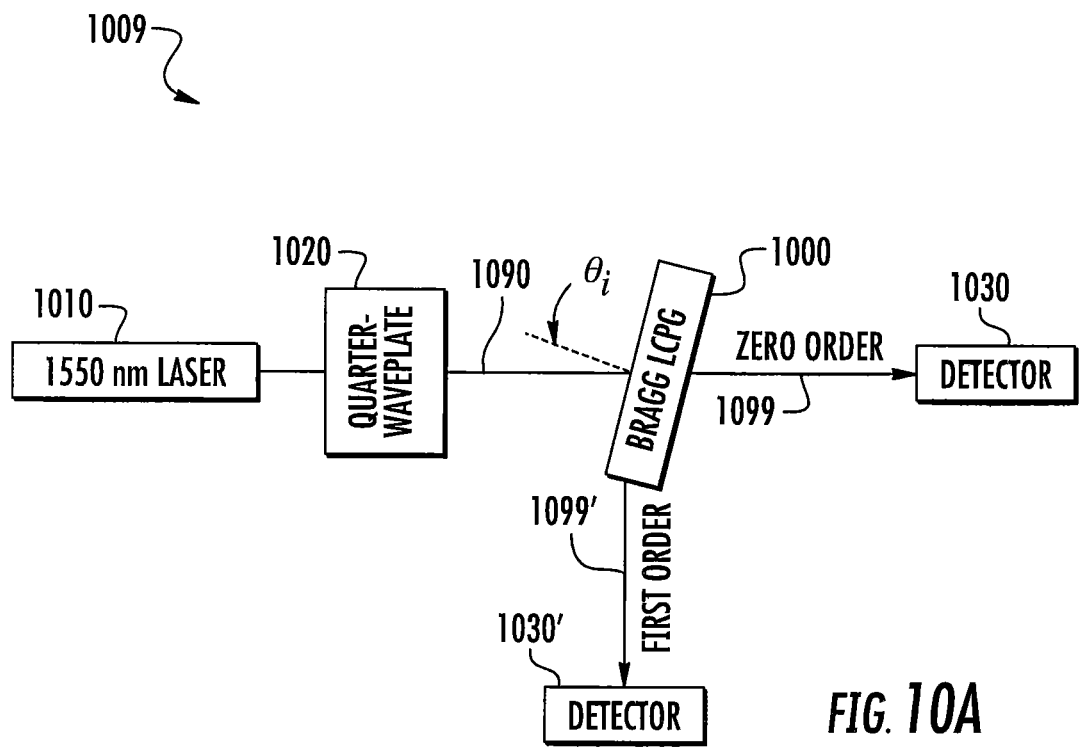
FIG. 10A is a diagram illustrating a setup for a slanted Bragg LCPG diffraction efficiency measurement, where the first order diffraction achieves total internal reflection (TIR) within the waveguide, according to some embodiments of the present invention.
Figure 10B:
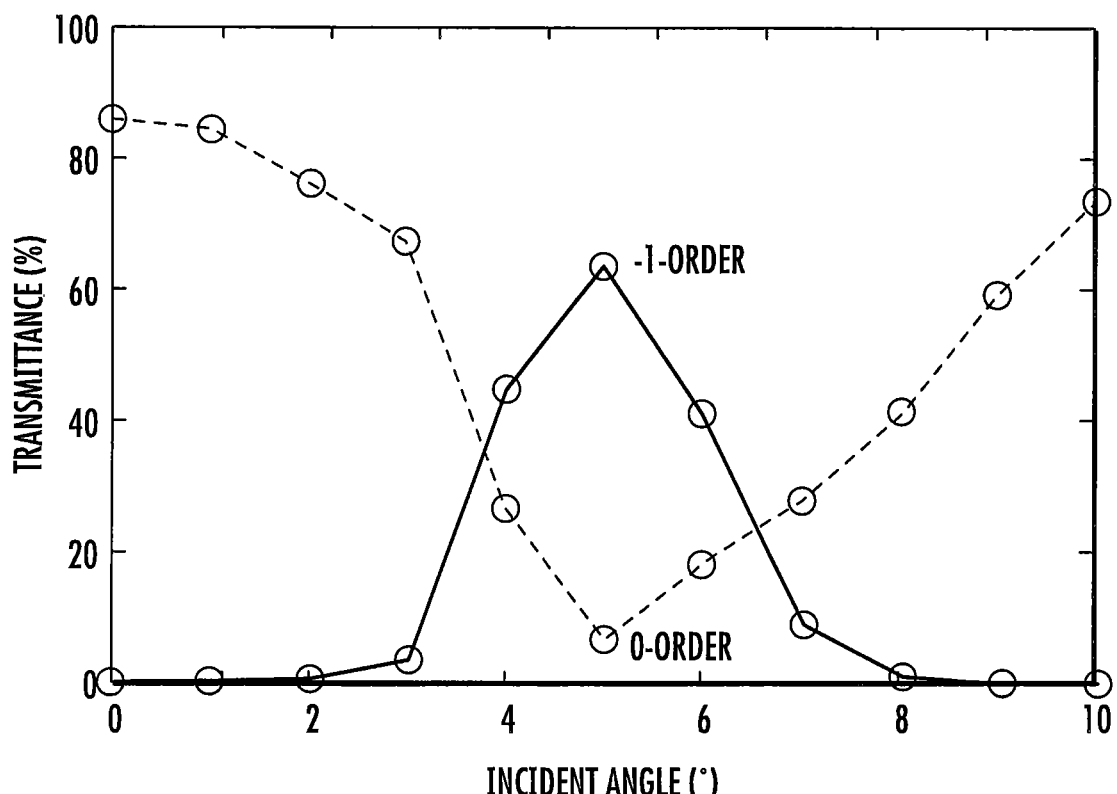
FIG. 10B is a graph illustrating measured transmittance out of the edge of the waveguide according to some embodiments of the present invention.

FIG. 10A shows a measurement setup 1009 used to characterize the transmissive slanted Bragg LCPG of the example of FIG. 9. In particular, linearly polarized light from a 1550 nm laser 1010 was passed through a Quarter-Wave Plate (QWP) 1020 to adjust the polarization state to provide circularly polarized light 1090, which was provided to the Bragg LCPG 1000 at an incident angle $\theta_i$, which was varied by rotating the sample Bragg LCPG 1000. The amount of light diffracted in the zero order 1099 and the first order 1099' were measured by using photo-detectors 1030, 1030'. FIG. 10B shows the result when the input light 1090 was circularly polarized and the incidence angle $\theta_i$ was varied. For small incidence angles, the zero order power was low, with a minimum of ~7% at $\theta_i$=5°. Nearly or substantially all the remaining light was coupled into the waveguide (i.e., substrate) and experienced TIR multiple times. Due to non-uniformities in the sample, some scattering loss was experienced within the waveguide. Nevertheless, most of this light (~64%) eventually escaped from the substrate into a detector. By normalizing out this effect, which occurs after the interaction with the slanted Bragg LCPG, at least ~90% diffraction efficiency (=0.641(0.64+0.07)) was achieved. Efficiency can be further improved by adjusting the chiral concentration and/or LCP thickness, and/or by adjusting the optimal incidence angle.

Figure 11:
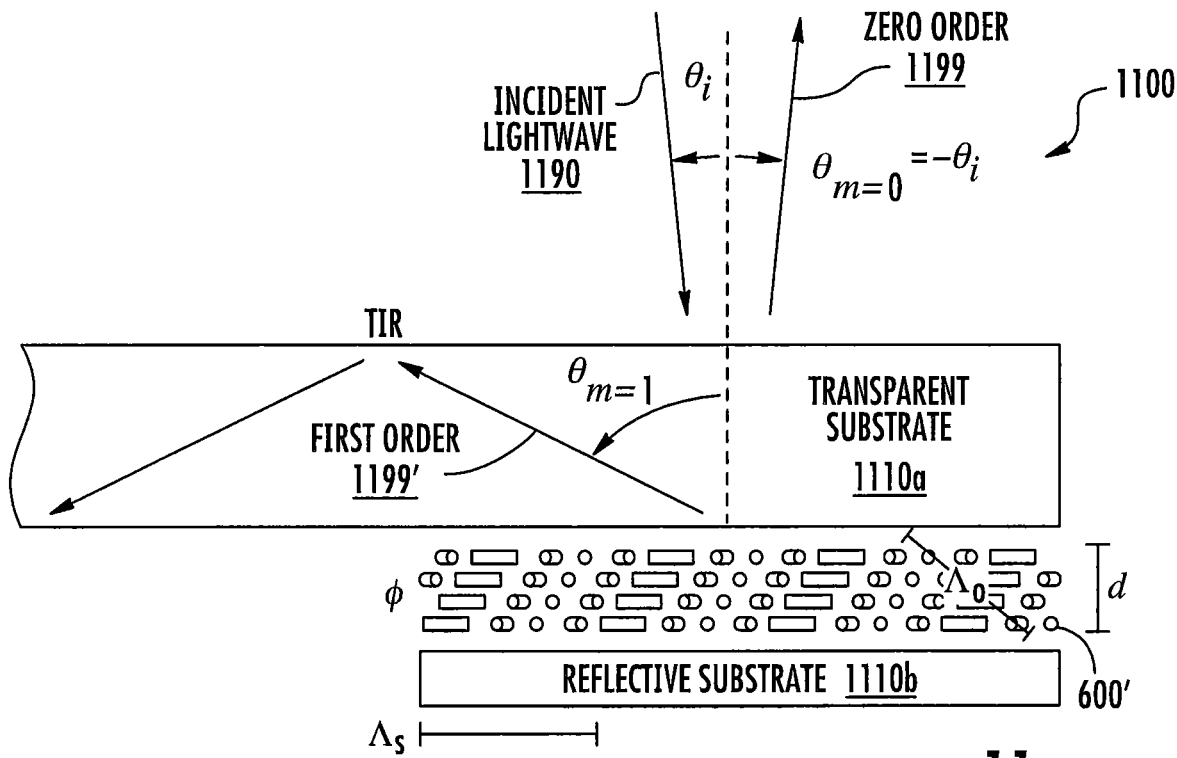
FIG. 11 is a diagram illustrating lightwave behavior with a reflective slanted Bragg LCPG configured to achieve total internal reflection into a waveguide according to some embodiments of the present invention.

An optical element 1100 including a Bragg LCPG arrangement according to yet still further embodiments of the present invention is shown in FIG. 11, which is a variation of the embodiment 900 of FIG. 9. In this case, the slanted Bragg LCPG 600' is a reflective type (see FIG. 8), and is arranged on the opposite side of the incident light 1190. As in FIG. 9, the first order diffraction direction is also along a direction for which TIR occurs. In particular, as shown in FIG. 11, the Bragg LCPG 600' is formed or mounted on a reflective substrate 1110b, such as a metallic mirror or semiconductor, and is optically coupled to a transparent substrate 1110a opposite to the reflective substrate 1110b. Because the lightwaves in this embodiment must pass through the LCPG layer 600' twice, the total thickness d of the LCPG layer 600' is approximately half the thickness of the LCPG layer 600 of FIG. 9. The incident light 1190 is transmitted through the transparent substrate 1110a to the slanted Bragg LCPG 600' and diffracted into zero and first order beams, which are reflected by the reflective substrate 1110b and transmitted back through the slanted Bragg LCPG 600' (which reverses the polarization of the beams) to provide the zero order 1199 and first order 1199' light output beams to the transparent substrate 1110a.

The diffraction angle $\theta_{m=1}$ of the first order light output beam 1199' within the substrate 1110a is greater than the critical angle and results in total internal reflection (TIR). The diffraction angle $\theta_{m=0}$ of the zero order light output beam 1199 is equal to but opposite the incident angle $\theta_i$ relative to a direction perpendicular to the element 1100.

Figure 12:
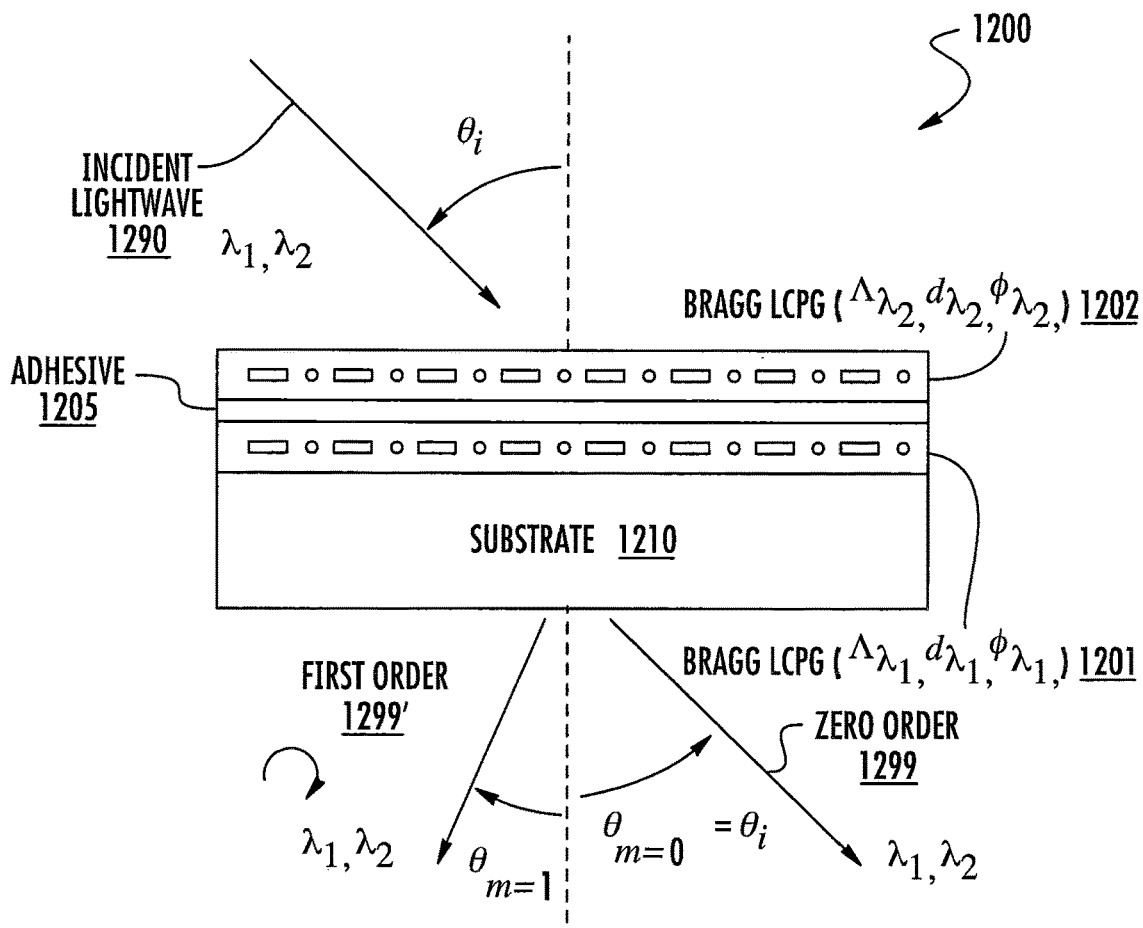
FIG. 12 is a diagram illustrating stacked Bragg LCPGs according to some embodiments of the present invention.

An optical element 1200 including Bragg LCPG arrangement according to other embodiments of the present invention is shown in FIG. 12, where two or more Bragg LCPGs 1201, 1202 are arranged into a stacked configuration on a substrate 1210, optionally with an adhesive 1205, substrates, and/or other planar elements in between. Each Bragg LCPG 1201, 1202 can be formed, for example, according to the embodiments 100 and/or 600 of FIGS. 1 and/or 6, and may be configured to have at least one parameter (e.g., optical element grating period $\Lambda$, thickness d, and/or twist $\phi$) different from each other. As an example, the two Bragg LCPGs 1201 and 1202 may be configured to diffract incident light 1290 including two different wavelengths 21 and 22 into substantially the same first order direction (shown by output beam 1299') with high or optimal efficiency, which may at least require each Bragg LCPG 1201, 1202 to have different optical element grating periods $\Lambda\lambda 1$ and $\Lambda\lambda 2$. Further, with additional Bragg LCPGs, such stacks may be designed such that substantially all the light is redirected along the normal direction with substantially the same polarization as in a Polarization Conversion System (PCS) using the polarization properties of Bragg LCPGs. Stacked Bragg LCPGs may be preferentially employed within many applications, including but not limited to near-to-eye and heads-up-displays, turning films for backlights (etc), projectors, solar concentrators, fiber optic couplers, distributed feedback lasers, beam steering, and optical data storage devices.

Figure 13:
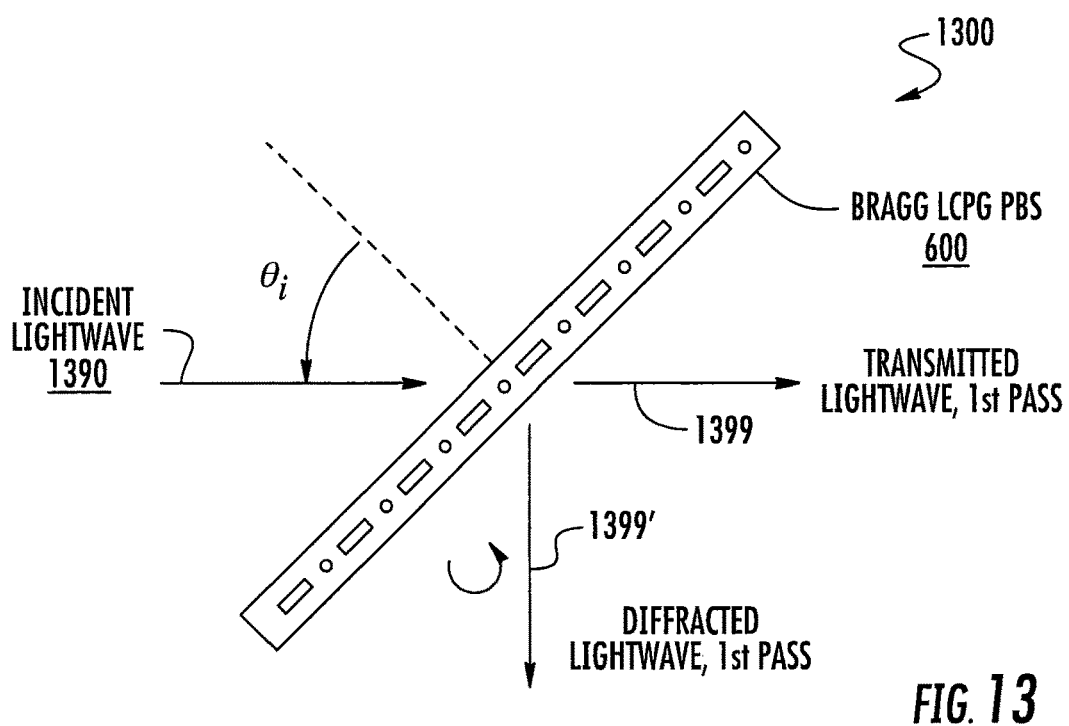
FIG. 13 is a diagram illustrating lightwave behavior with a transmissive Bragg LCPG configured to act as a polarizing beam splitter (PBS) according to some embodiments of the present invention.

A polarizing beam splitter (PBS) 1300 according to some embodiments of the present invention is shown in FIG. 13, where a Bragg LCPG 600 according to the embodiments of FIG. 6 is configured to act as a polarizing beam splitter (PBS). The Bragg LCPG 600 is configured to accept incident light 1390 at certain incident angles $\theta_i$, (for example, near 45°), and diffract the output light 1399, 1399' into two output diffraction orders (zero order output light 1399 and first order output light 1399'; also referred to as the transmitted lightwave 1399 and the diffracted lightwave 1399') preferably in directions greater than about 45° from each other, greater than about 60° from each other, or up to approximately 90° from each other, where each diffraction order 1399, 1399' may be approximately circularly polarized with the same handedness, regardless of the input polarization state. Retarders may optionally be added on either side of the Bragg LCPG 600 to control both the input and output polarization states, but this is not required. FIG. 13 shows a single pass configuration 1300 where incident light 1390 enters from only one side of the Bragg LCPG 600. PBS elements 1300 may be useful in several applications including spectroscopy, displays, holography, and polarimetry.

Figure 14:
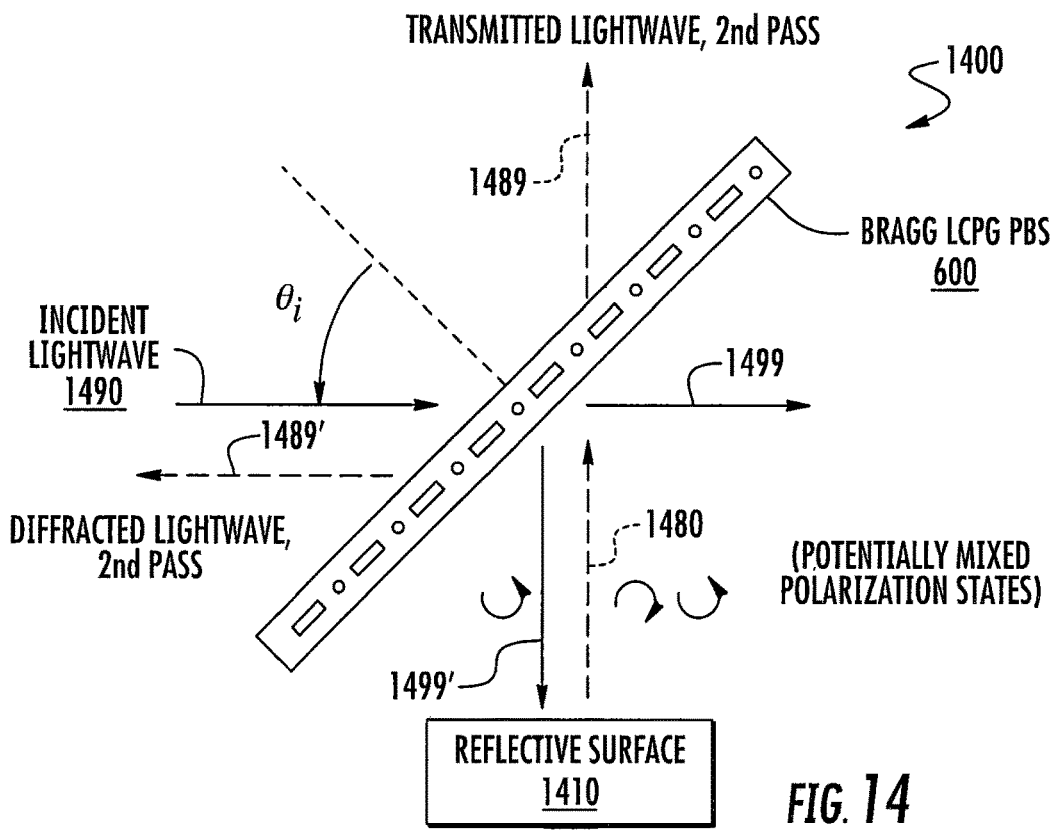
FIG. 14 is a diagram illustrating lightwave behavior with a transmissive Bragg LCPG acting as a PBS in combination with a reflective surface according to some embodiments of the present invention.

The PBS configuration 1400 in FIG. 14 is similar to the embodiment of FIG. 13, but further includes the Bragg LCPG PBS 600 with a reflective surface 1410, object, or device. The reflective surface may be configured or arranged at either the transmitted 1399 or diffracted 1399' light output paths of FIG. 13. In the example of FIG. 14, the zero order light beam 1499 is transmitted, while the reflective surface 1410 is placed in the first order/diffracted light beam path 1499'. The reflective surface 1410 may have features and/or properties which produce a diversity of polarizations, and at least partially redirects light 1480 having such mixed polarization states back toward the Bragg LCPG 600 for a 2nd pass. The reflective surface 1410 may be implemented in many forms, including but not limited to a patterned birefringent structure, topological height differences, and/or a plurality of materials. The light 1480 reflected back toward the Bragg LCPG 600 is analyzed according to its polarization, where some of the light 1489' is diffracted and some of the light 1489 is transmitted, as shown in FIG. 14. Such embodiments may be useful for various applications including metrology, polarimetry, remote sensing, and imaging.

Figure 15:
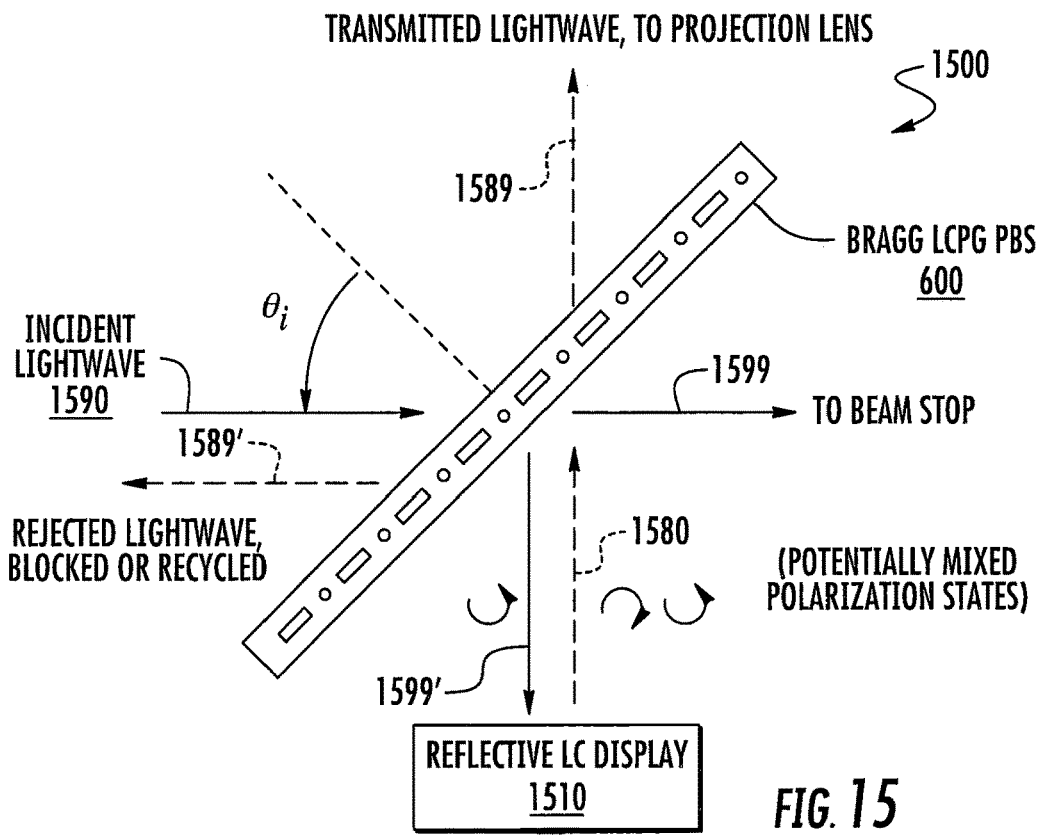
FIG. 15 is a diagram illustrating lightwave behavior with a transmissive Bragg LCPG acting as a PBS in combination with a reflective LC display to achieve an image control system according to some embodiments of the present invention.

FIG. 15 illustrates a PBS configuration 1500 similar to the embodiment of FIG. 14, but where the reflective surface 1510 is an LC display system such as an LC microdisplay, e.g., as part of a projection display system. Note, however, that the combination of the Bragg LCPG PBS in arrangement with an LC microdisplay is a general subassembly useful to many other applications including adaptive optics and holography, and is not restricted to projection display applications. In FIG. 15, the transmitted, zero order lightwave 1599 in the 1st pass is blocked by a beam stop, to reduce or prevent parasitic reflections sent back to the LCPG 600 and ensure high contrast in the projected images. The diffracted, first order lightwave 1599' is directed onto the reflective LC display 1510, and is reflected thereby. Similar to the embodiment of FIG. 14, the reflective surface 1510 may have features and/or properties which result in a diversity of polarizations, and at least partially redirects light 1580 having such mixed polarization states back toward the Bragg LCPG 600 in some embodiments. The reflected light beam 1580 from the LC display 1510 contains image information which is selectively separated by the polarization sensitive Bragg LCPG 600 into zero order/transmitted and first order/rejected light beams 1589 and 1589', where the transmitted lightwave 1589 is directed to a projection lens, for example, for magnification and projection onto a screen. The diffracted lightwave 1589' is blocked or recycled. This configuration 1500 may be used in various LC projection display systems, and therefore relevant for such applications.

Figure 16A:
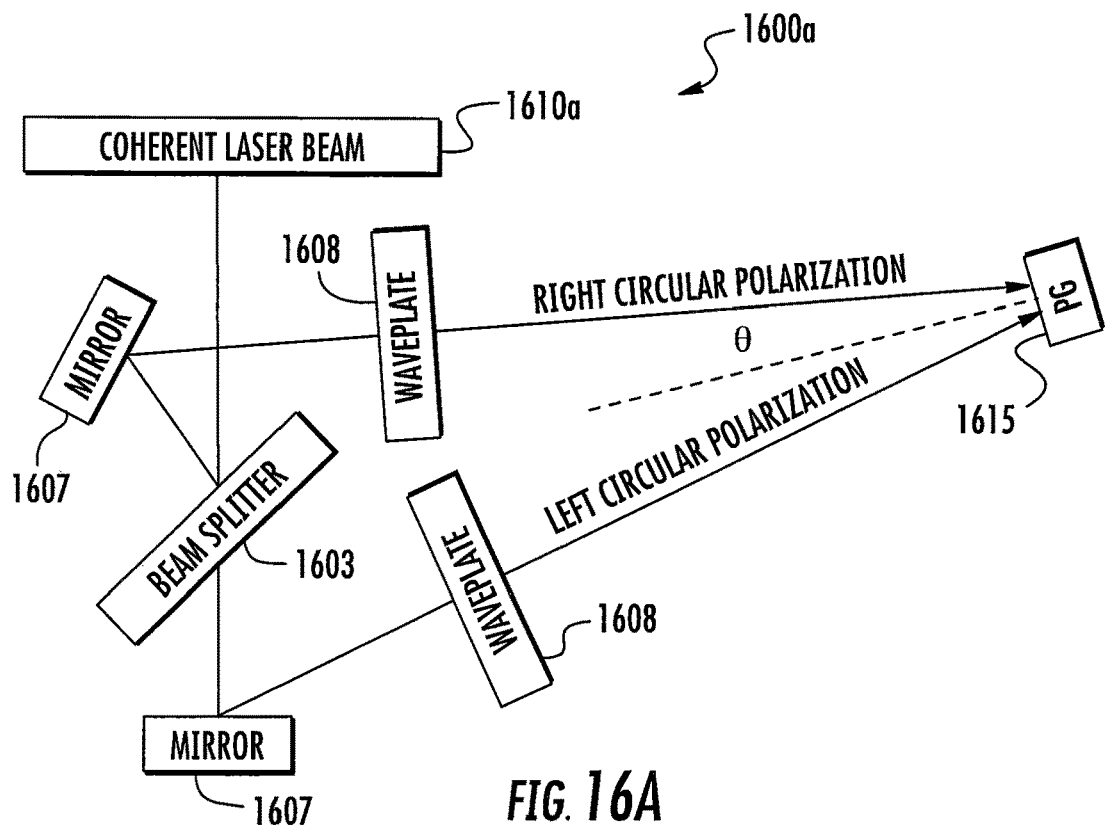
FIG. 16A is a diagram illustrating methods of fabricating Bragg PGs using holographic lithography according to some embodiments of the present invention.
Figure 16B:
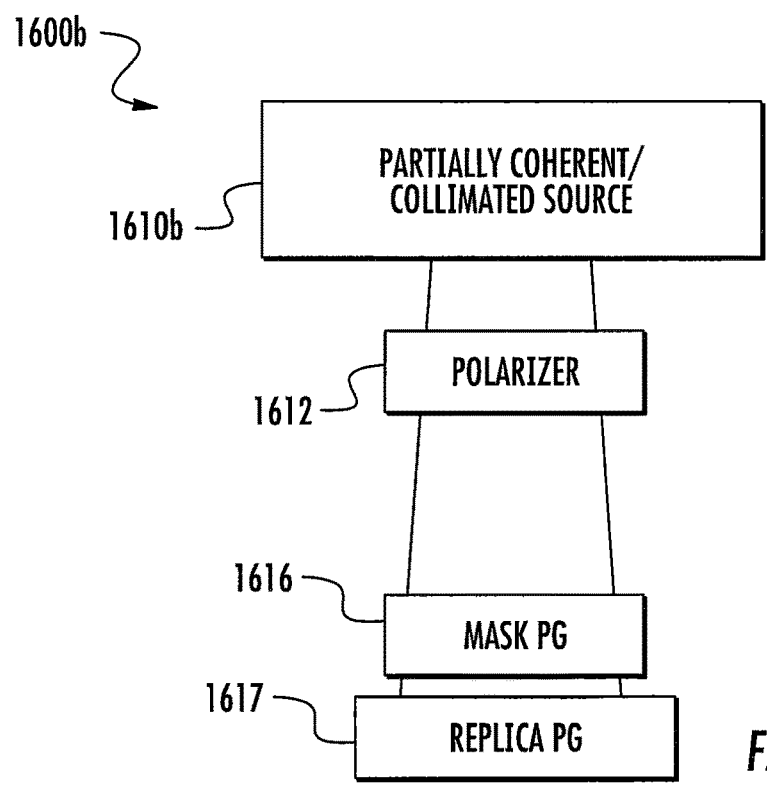
FIG. 16B is a diagram illustrating methods of fabricating Bragg PGs using a grating replication approach according to some embodiments of the present invention.

In the above description, a "standard PG holographic lithography method" may refer to the arrangement shown in FIGS. 16A and 16B. FIGS. 16A and 16B show two possible approaches 1600a and 1600b to pattern the PG alignment condition within the LPP to define an optical element grating period sufficient such that the resulting LCPG satisfies the Bragg condition (Q>1), using photo-alignment materials and LC materials as described for example in U.S. Pat. No. 8,358,400 to Escuti et al., the disclosure of which is incorporated by reference herein. A spatially varying polarization pattern is recorded by the LPP as an alignment direction. For PGs, the polarization pattern may be predominantly linearly polarized throughout, but with an orientation angle that is linearly dependent on position (i.e., $\Phi(x)=\pi x/\Lambda$). The light source may be a highly coherent and collimated light source 1610 (e.g., laser), or it may be partially coherent and/or partially collimated light source 1610b (e.g., high pressure lamp or light emitting diode (LED)), which is transmitted through a polarizer 1612. The light sources 1610a, 1610b may emit at an ultraviolet (UV) wavelength, but this is not required. The first approach 1600a of FIG. 16A is referred to as holographic lithography because, after the output of the light source 1610a is passed through a beam splitter 1603, mirrors 1607, and waveplates 1608, the two resulting beams (illustrated as having opposite circular polarizations) interfere at the recording surface 1615, and was used in several of the examples described herein. The second approach 1600b of FIG. 16B is referred to as proximity lithography, or holographic replication, because a mask pattern 1616 is copied onto a replica PG 1617, as described for example in U.S. Pat. No. 8,358,400 to Escuti et al. Either may be used for patterning and fabrication of the Bragg LCPGs described herein.

Embodiments described herein have primarily focused on arrangements in which the optical element grating period in a given Bragg LCPG is constant throughout. However, it will be understood that different regions of the same Bragg LCPG can have a different local grating period, effectively providing $\Lambda(x,y)$, resulting in an optical axis angle that is potentially two dimensional $1 > (x,y)$. It will be further understood that any such modifications of the embodiments described herein are included in the scope of the invention.

Accordingly, embodiments of the present invention provide a new class of optical elements called Bragg Liquid Crystal Polarization Gratings (LCPGs), which address structures, methods, and uses overcoming prior art problems of achieving high efficiency diffraction in PGs in the Bragg regime, which also include large diffraction angles. Some embodiments include films for in/out-coupling to/from waveguides using Bragg LCPGs. Embodiments of the invention can achieve high diffraction efficiency and limited diffraction orders with polarization selectivity in Bragg PGs in a simpler way than conventional elements, with lower loss, and can support a wider design parameter space. Embodiments of the present invention may be used in a variety of applications, including but not limited to polarimetry and ellipsometry, bioimaging, magnetooptic data storage, polarization multiplexing/demultiplexing, polarization based light modulators, polarizing switches, and beam splitters.

Some Bragg LCPG elements fabricated in accordance with embodiments of the present invention may have a broadband spectrum, using for example the techniques of achromatic PG and MTRs as described in U.S. patent application Ser. No. 12/596,189 to Escuti et al. entitled "LOW-TWIST CHIRAL LIQUID CRYSTAL POLARIZATION GRATINGS AND RELATED FABRICATION METHODS" and Ser. No. 13/646,166 to Escuti et al. entitled "MULTI-TWIST RETARDERS FOR BROADBAND POLARIZATION TRANSFORMATION AND RELATED FABRICATION METHODS," the disclosures of which are incorporated by reference herein.

Embodiments of the present invention are described herein with reference to liquid crystal (LC) materials. Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As used herein, the liquid crystals can have a nematic phase, a chiral nematic phase, a smectic phase, a ferroelectric phase, and/or another phase. As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a controllable way. A number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Additional structures and/or methods for use with some embodiments of the present invention are discussed in PCT Publication No. WO 2006/092758 to Escuti, et al., the disclosure of which is incorporated by reference herein in its entirety.

It will be understood by those having skill in the art that, as used herein, a "transmissive" or "transparent" substrate or element may allow at least some of the incident light to pass therethrough. In other words, transmissive or transparent elements described herein need not be perfectly transparent, and may have isotropic or dichroic absorption characteristics and/or may otherwise absorb some of the incident light. In contrast, a "reflective" substrate as described herein may reflect at least some of the incident light. A transparent substrate or spacer may be a glass substrate in some embodiments.

Also, "polymerizable liquid crystals" may refer to relatively low-molecular weight liquid crystal materials that can be polymerized, and may also be described herein as "reactive mesogens." In contrast, "non-reactive liquid crystals" may refer to relatively low-molecular weight liquid crystal materials that may not be polymerized.

As used herein, "zero-order" light propagates in a direction substantially parallel to that of the incident light, i.e., at a substantially similar angle of incidence, and may be referred to herein as "on-axis" light. In contrast, "non-zero-order light," such as "first-order" light, propagates in directions that are not parallel to the incident light, and is referred to herein as "off-axis" light. "Partially collimated" light, as described herein, may describe light rays or beams that propagate substantially parallel to one another, but may have some divergence (e.g., difference in beam diameter with distance from the source).

It will be further understood that, in some embodiments, a light source can provide elliptically polarized or partially polarized light (e.g. such as that from some laser diode and LED light sources).

It will also be understood that anti-reflection coatings may be applied on all surfaces that interface with the ambient medium (e.g., air). It will also be understood that the optical elements described herein may in some cases be laminated together without an air gap in between them, and in other cases may be arranged with an air gap in between.

It will be understood that, as described herein, the terminology "retarder" and "waveplate" may be used interchangeably, and the following additional terms are also to be considered equivalent, unless otherwise indicated: any "retardation plate," "compensation film," and "birefringent plate" that is uniaxial, biaxial, or inhomogeneous. Retarders as described herein may be broadband (i.e., achromatic) or narrowband (i.e., chromatic).

It will also be understood that embodiments of the present invention are not limited to the particular materials described herein, but may be implemented using any and all material layers that function as described herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner That which is claimed:

1. An optical element, comprising:
a monolithic structure comprising a plurality of stacked birefringent sublayers defining a grating in a Bragg regime configured to alter a direction of propagation of light,
wherein the stacked birefringent sublayers have respective thicknesses that are less than a wavelength of the light, and respectively comprise local optical axes that vary along respective interfaces between adjacent ones of the stacked birefringent sublayers to define respective grating periods,
wherein the plurality of stacked birefringent sublayers is configured to diffract the light into a first order beam, and wherein a difference between angles of propagation of a zero order beam and the first order beam is greater than about 45 degrees.

2. The optical element of claim 1, wherein the wavelength of the light comprises a wavelength $\lambda$, the respective grating periods define a period $\Lambda$ of the optical element, an aggregate thickness comprising a sum of the respective thicknesses comprises a thickness d, and an average refractive index of the stacked birefringent sublayers comprises a refractive index n such that a variable Q is greater than 1 for the wavelength $\lambda$, where $Q=2\pi\lambda d/\Lambda^2 n$.

3. The optical element of claim 1, wherein the respective thicknesses are less than the respective grating periods defined by the local optical axes of the stacked birefringent sublayers, and wherein an aggregate thickness comprising a sum of the respective thicknesses is greater than the respective grating periods.

4. The optical element of claim 1, wherein the plurality of stacked birefringent sublayers is configured to diffract the light into the first order beam with a diffraction efficiency of about 94% or more responsive to receiving the light at the angle of incidence that is approximately equal to the Bragg angle.

5. The optical element of claim 1, wherein the respective grating periods of the stacked birefringent sublayers are less than a wavelength of the light.

6. The optical element of claim 1, further comprising:
a transparent substrate that is optically coupled to the plurality of stacked birefringent sublayers,
wherein the plurality of stacked birefringent sublayers is configured to diffract the light into the first order beam at an angle that is greater than a critical angle for total internal reflection (TIR) within the transparent substrate.

7. The optical element of claim 1, wherein the stacked birefringent sublayers comprise a material having a birefringence of less than about 0.4.

8. The optical element of claim 7, wherein the stacked birefringent sublayers respectively comprise liquid crystal sublayers having liquid crystal molecule orientations that define the local optical axes.

9. The optical element of claim 1, wherein the plurality of stacked birefringent sublayers is configured to diffract the light into the zero order beam and the first order beam having a substantially same polarization, which is different than an incident polarization of the light.

10. The optical element of claim 9, wherein the substantially same polarization of the zero order and first order beams comprises an at least approximately circular polarization of a same handedness.

11. The optical element of claim 1, further comprising:
a reflective element positioned to receive the zero order beam and/or the first order beam output from the stacked birefringent sublayers and reflect the zero order beam and/or the first order beam back theretoward.

12. The optical element of claim 11, wherein the reflective element is configured to output light having a plurality of different polarizations responsive to receiving the zero order beam and/or the first order beam from the stacked birefringent sublayers.

13. The optical element of claim 1, wherein the wavelength of the light is about 400 nanometers (nm) to about 1700 nm.

14. The optical element of claim 13, wherein the respective grating periods are about 1000 nanometers (nm) or less, and wherein the respective thicknesses are about 100 nm to about 300 nm.

15. The optical element of claim 1, further comprising:
a substrate including the plurality of stacked birefringent sublayers thereon,
wherein the optical element is configured to diffract and reflect the light to output at least one reflected diffraction order comprising the first order beam.

16. The optical element of claim 15, wherein the substrate comprises a reflective substrate.

17. The optical element of claim 1, wherein one or more of the stacked birefringent sublayers comprise chiral layers, wherein the local optical axes of the one or more of the stacked birefringent sublayers are rotated over respective thicknesses thereof to define respective twist angles.

18. The optical element of claim 17, wherein ones of the respective twist angles and/or respective thicknesses are different among the stacked birefringent sublayers.

19. The optical element of claim 18, wherein the ones of the respective thicknesses and/or respective twist angles are configured to control an angular response of the optical element.

20. The optical element of claim 1, wherein the plurality of stacked birefringent sublayers comprises first birefringent sublayers defining a first grating in the Bragg regime and having respective first grating periods and are configured to alter the direction of propagation of a first wavelength of the light, and further comprising:
a plurality of stacked second birefringent sublayers defining a second grating in the Bragg regime on the first birefringent sublayers and respectively configured to alter the direction of propagation of a second wavelength of the light,
the second birefringent sublayers having respective local optical axes that vary along respective interfaces therebetween to define respective second grating periods,
wherein the first and second birefringent sublayers are configured to diffract the first and second wavelengths of the light, respectively, into respective first order beams.

21. The optical element of claim 20, wherein the respective first order beams have a substantially same propagation direction.

22. The optical element of claim 20, wherein the second grating periods, an aggregate thickness of the second birefringent sublayers, and/or an average refractive index of the second birefringent sublayers differ from those of the first birefringent layers.

23. A diffractive optical element, comprising:
a monolithic structure comprising a plurality of stacked liquid crystal sublayers defining a grating in a Bragg regime, the plurality of stacked liquid crystal sublayers having respective thicknesses that are less than an operational wavelength $\lambda$, of light and collectively define a thickness d, an average refractive index n, and comprising liquid crystal molecule orientations that vary in a direction along a surface thereof to define a grating period $\Lambda$ of the diffractive optical element such that a variable Q is greater than 1 for the operational wavelength $\lambda$, of the light, where $Q=2\pi\lambda d/\Lambda^2 n$,
wherein the plurality of stacked liquid crystal sublayers is configured to diffract the light into a first order beam, and wherein a difference between angles of propagation of a zero order beam and the first order beam is greater than about 45 degrees.

24. The diffractive optical element of claim 23, wherein the grating period $\Lambda$ of the diffractive optical element is less than the operational wavelength $\lambda$, of the light.

25. The diffractive optical element of claim 23, further comprising:
a substrate including the plurality of stacked liquid crystal sublayers thereon,
wherein the diffractive optical element is configured to diffract and reflect the light to output at least one reflected diffraction order comprising the first order beam.

26. The diffractive optical element of claim 25, wherein the substrate comprises a reflective substrate.

27. The diffractive optical element of claim 23, wherein the plurality of stacked liquid crystal sublayers comprise polymerized liquid crystal sublayers.

28. The diffractive optical element of claim 27, wherein the respective thicknesses of the stacked polymerized liquid crystal sublayers are less than the grating period $\Lambda$ of the diffractive optical element, and wherein the thickness d is greater than the grating period $\Lambda$ of the diffractive optical element and the operational wavelength $\lambda$, of the light.

29. The diffractive optical element of claim 27, wherein one or more of the stacked polymerized liquid crystal sublayers comprise chiral layers, wherein the liquid crystal molecule orientations of the one or more of the stacked polymerized liquid crystal sublayers are rotated over the respective thicknesses thereof to define respective twist angles $\phi$, wherein the respective twist angles $\phi$ and/or the respective thicknesses are different among the stacked polymerized liquid crystal sublayers.

30. The diffractive optical element of claim 29, wherein the respective thicknesses and/or respective twist angles $\phi$ are configured to control an angular response of the diffractive optical element.

31. An optical element, comprising:
a monolithic structure comprising a plurality of stacked first birefringent sublayers defining a first grating in a Bragg regime configured to alter a direction of propagation of a first wavelength of light, wherein the first birefringent sublayers have respective thicknesses that are less than the first wavelength of the light, and respectively comprise local optical axes that vary along respective interfaces between adjacent ones of the first birefringent sublayers to define respective first grating periods; and
a plurality of stacked second birefringent sublayers defining a second grating in a Bragg regime on the first birefringent sublayers and configured to alter the direction of propagation of a second wavelength of the light,
wherein the first and second birefringent sublayers are configured to diffract the first and second wavelengths of the light, respectively, into respective first order beams.

* * * * *

UNITED STATES PATENT AND TRADEMARK OFFICE
CERTIFICATE OF CORRECTION

PATENT NO. : 10,859,740 B2  
APPLICATION NO. : 14/813660  
DATED : December 8, 2020  
INVENTOR(S) : Escuti et al.

Page 1 of 1

It is certified that error appears in the above-identified patent and that said Letters Patent is hereby corrected as shown below:

In the Specification

Column 3, Line 5: Please correct "wavelength $\lambda$ where" to read -- wavelength $\lambda$, where --

Column 10, Line 22: Please correct "$\theta_{m=0}$" to read -- $\theta_i$ --

Column 12, Line 7: Please correct "d=3" to read -- d=3 μm, --

In the Claims

Column 21, Line 6, Claim 23: Please correct "wavelength $\lambda$, of light" to read -- wavelength $\lambda$ of light --

Column 21, Line 12, Claim 23: Please correct "wavelength $\lambda$, of the light," to read -- wavelength $\lambda$ of the light, --

Column 21, Line 20, Claim 24: Please correct "wavelength $\lambda$, of the light." to read -- wavelength $\lambda$ of the light. --

Column 22, Line 3, Claim 28: Please correct "wavelength $\lambda$, of the light." to read -- wavelength $\lambda$ of the light. --

Signed and Sealed this  
Eleventh Day of May, 2021

Drew Hirshfeld  
*Performing the Functions and Duties of the  
Under Secretary of Commerce for Intellectual Property and  
Director of the United States Patent and Trademark Office*